(12) United States Patent
Abe et al.

(10) Patent No.: US 8,878,982 B2
(45) Date of Patent: Nov. 4, 2014

(54) ZOOM LENS AND IMAGE PICKUP APPARATUS EQUIPPED WITH THE SAME

(71) Applicant: Canon Kabushiki Kaisha, Tokyo (JP)

(72) Inventors: Hirofumi Abe, Utsunomiya (JP);
Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/903,894

(22) Filed: May 28, 2013

(65) Prior Publication Data
US 2013/0321655 A1 Dec. 5, 2013

(30) Foreign Application Priority Data

May 30, 2012 (JP) ................................. 2012-123561

(51) Int. Cl.
*H04N 5/232* (2006.01)
*G02B 27/64* (2006.01)
*G02B 15/173* (2006.01)
*G02B 15/14* (2006.01)

(52) U.S. Cl.
CPC ............ *G02B 15/14* (2013.01); *H04N 5/23287* (2013.01); *G02B 27/646* (2013.01); *G02B 15/173* (2013.01)
USPC ............ 348/357; 348/340; 359/676; 359/774

(58) Field of Classification Search
USPC .................... 348/340, 357; 359/676, 687, 774
See application file for complete search history.

(56) References Cited

U.S. PATENT DOCUMENTS

| 5,973,850 | A  | * | 10/1999 | Nagaoka ........................ 359/654 |
| 6,342,972 | B1 | * | 1/2002  | Yamanashi .................... 359/686 |
| 6,449,433 | B2 | * | 9/2002  | Hagimori et al. ............... 396/72 |
| 7,688,520 | B2 | * | 3/2010  | Nanba ............................ 359/687 |
| 7,738,185 | B2 | * | 6/2010  | Ohtake et al. .................. 359/687 |
| 7,782,543 | B2 | * | 8/2010  | Fujisaki ........................ 359/687 |
| 8,199,414 | B2 | * | 6/2012  | Li ................................. 359/687 |
| 8,284,496 | B2 | * | 10/2012 | Imamura ....................... 359/687 |
| 8,456,749 | B2 | * | 6/2013  | Peng et al. ..................... 359/687 |

FOREIGN PATENT DOCUMENTS

| JP | 2005-148437 A | 6/2005 |
| JP | 2007-052374 A | 3/2007 |

* cited by examiner

*Primary Examiner* — Ngoc-Yen Vu
(74) *Attorney, Agent, or Firm* — Canon USA Inc IP Division

(57) ABSTRACT

A zoom lens includes, in order from an object side to an image side, a positive first lens unit, a negative second lens unit, an aperture stop, a positive third lens unit, and a positive fourth lens unit. The third lens unit includes, in that order, a positive first lens sub-unit, and a negative second lens sub-unit. The second lens sub-unit is movable in a direction having a component perpendicular to an optical axis to change an image forming position in a direction perpendicular to the optical axis. A distance on the optical axis between the aperture stop and the third lens unit at a wide-angle end, a composite focal length of the first lens unit and the second lens unit at the wide-angle end, a focal length of the first lens sub-unit, and a focal length of the second lens sub-unit are appropriately set.

10 Claims, 21 Drawing Sheets

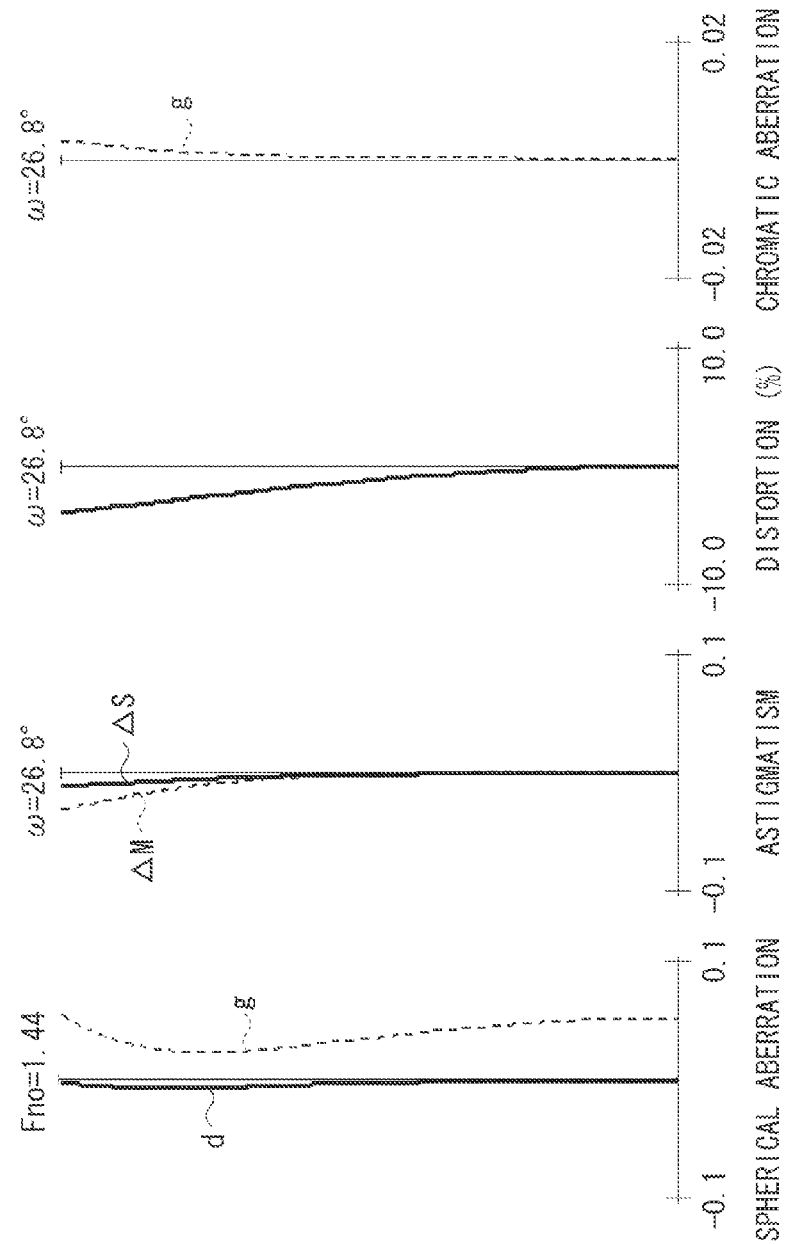

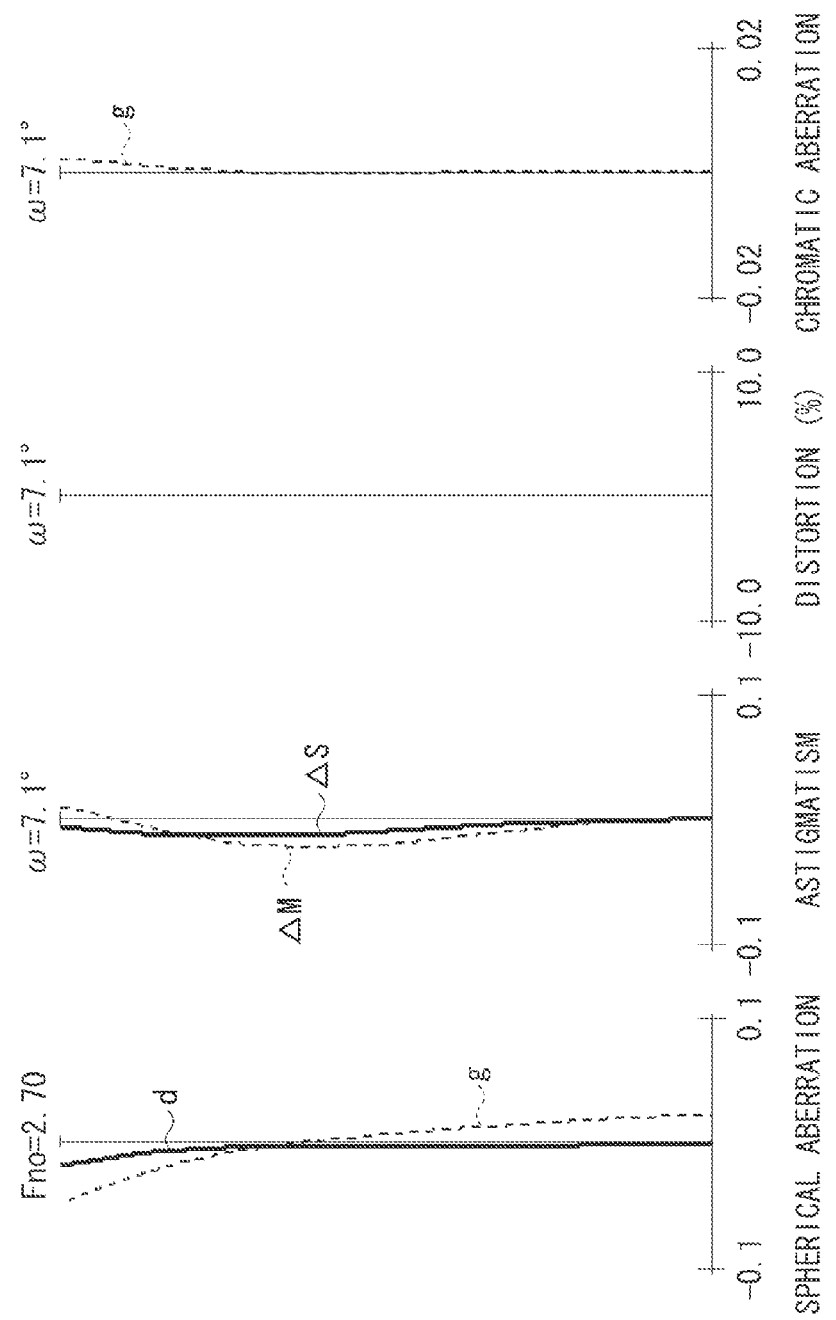

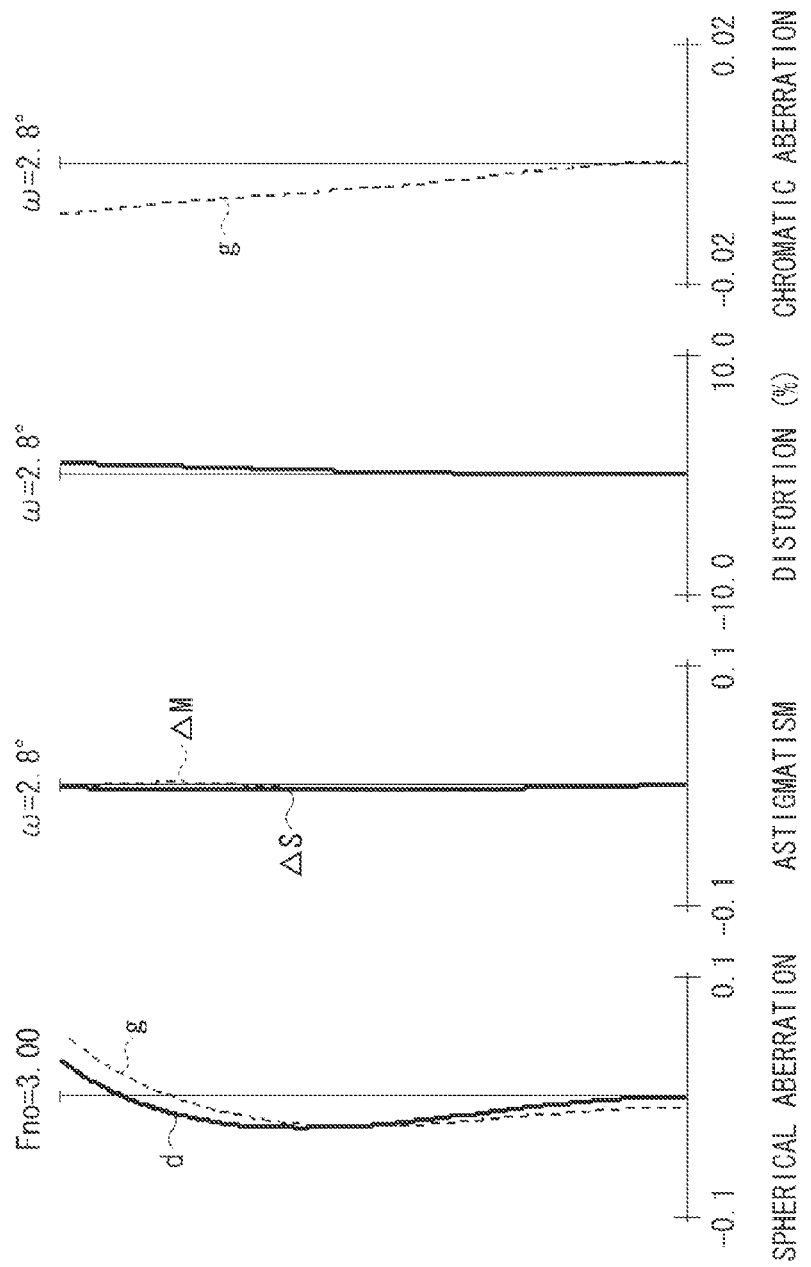

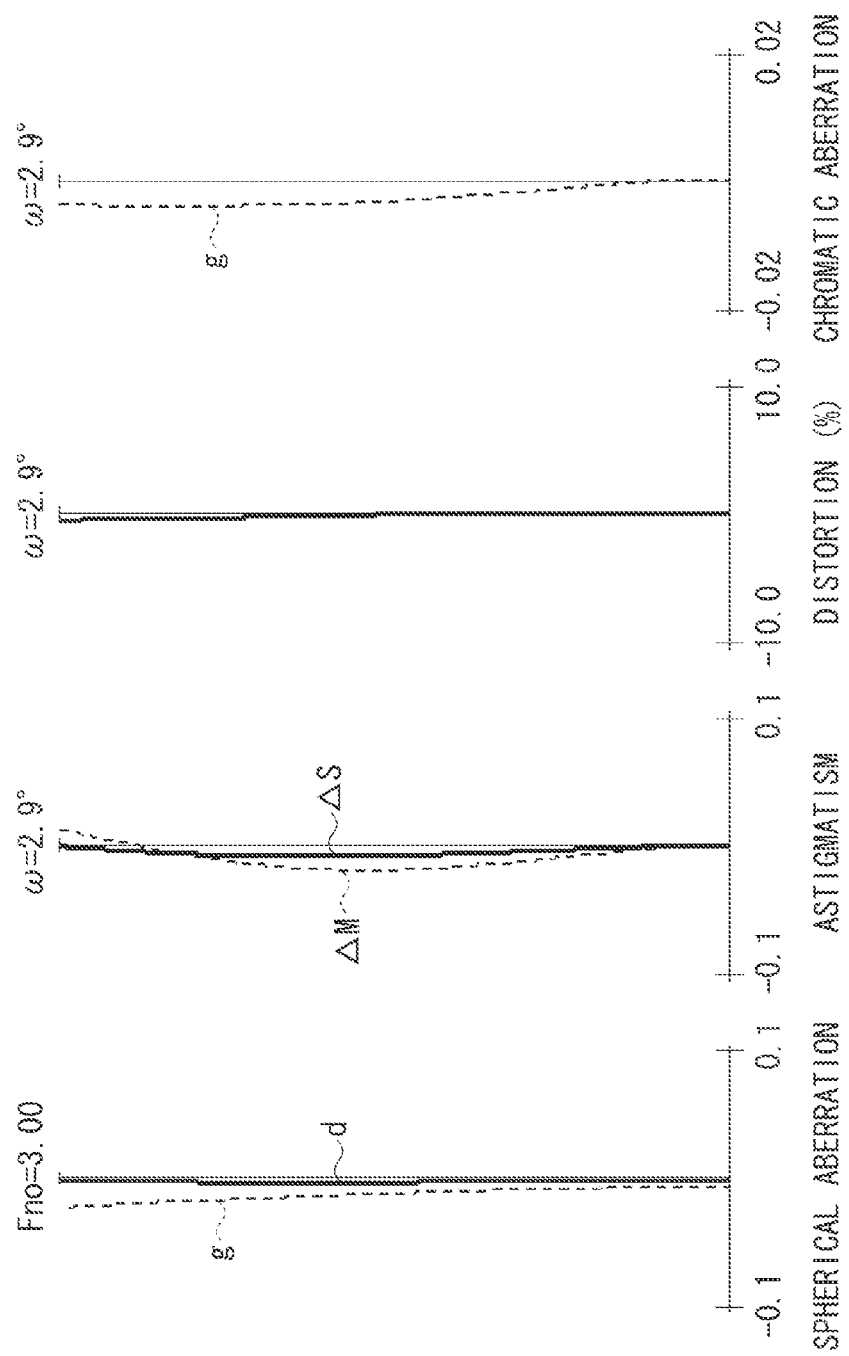

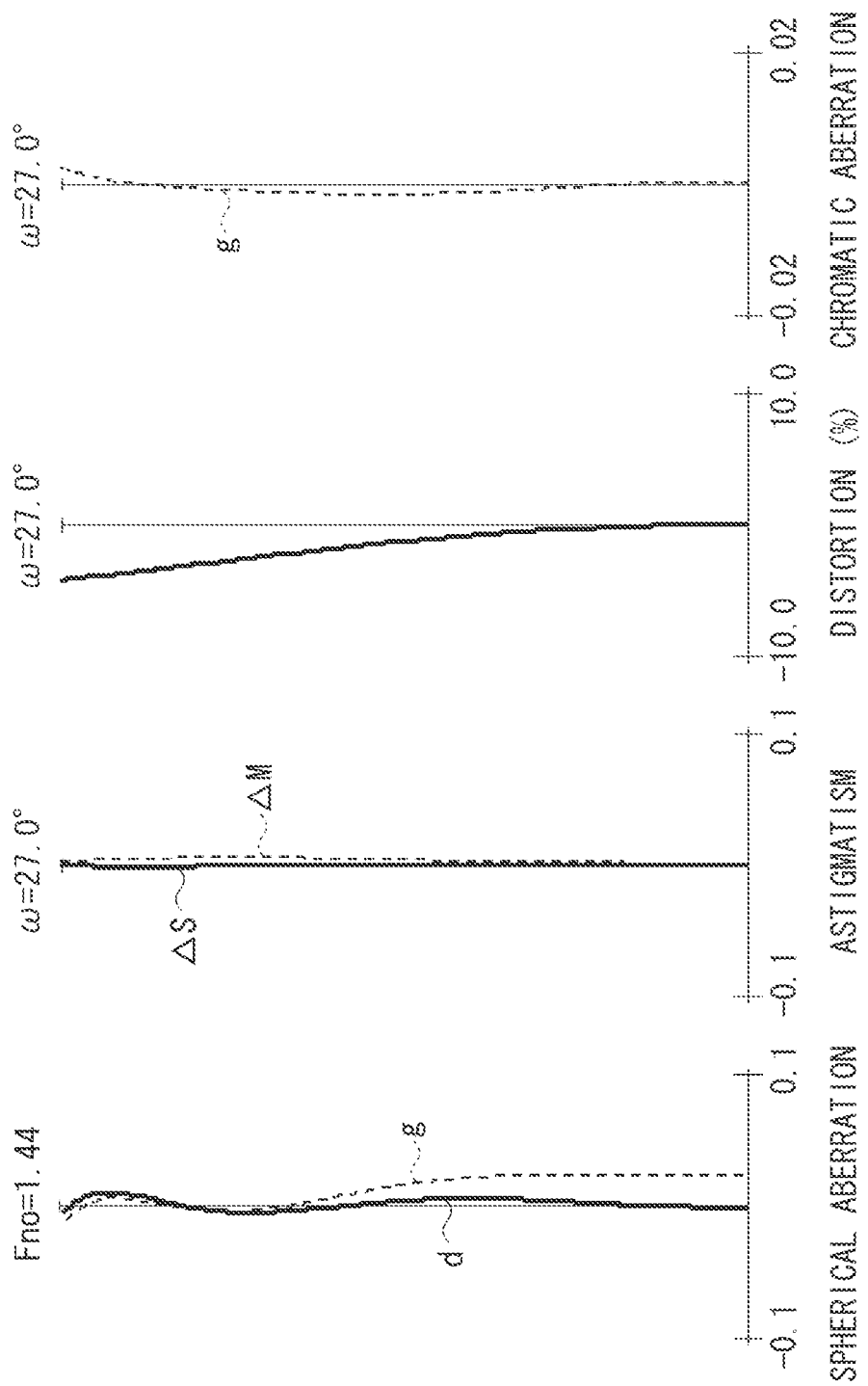

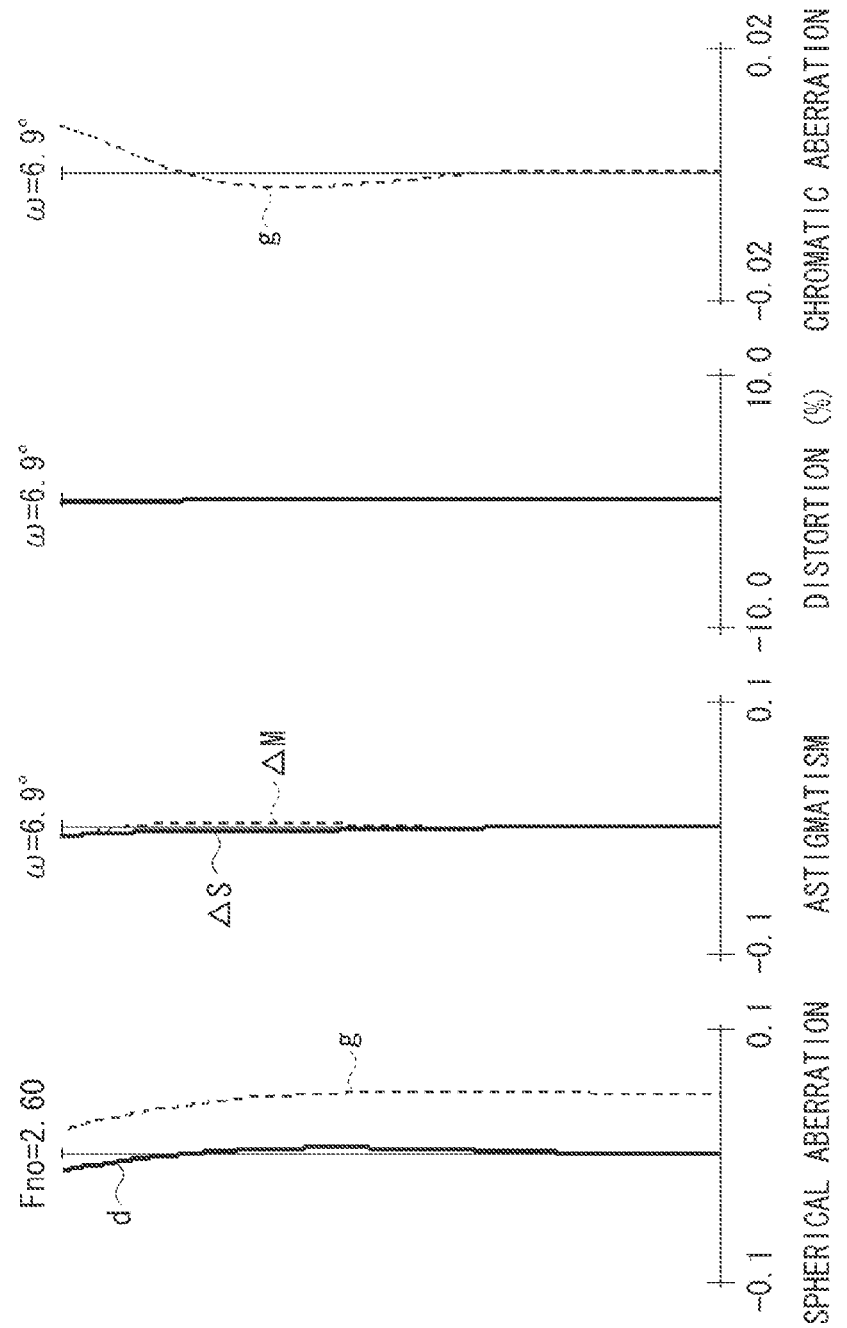

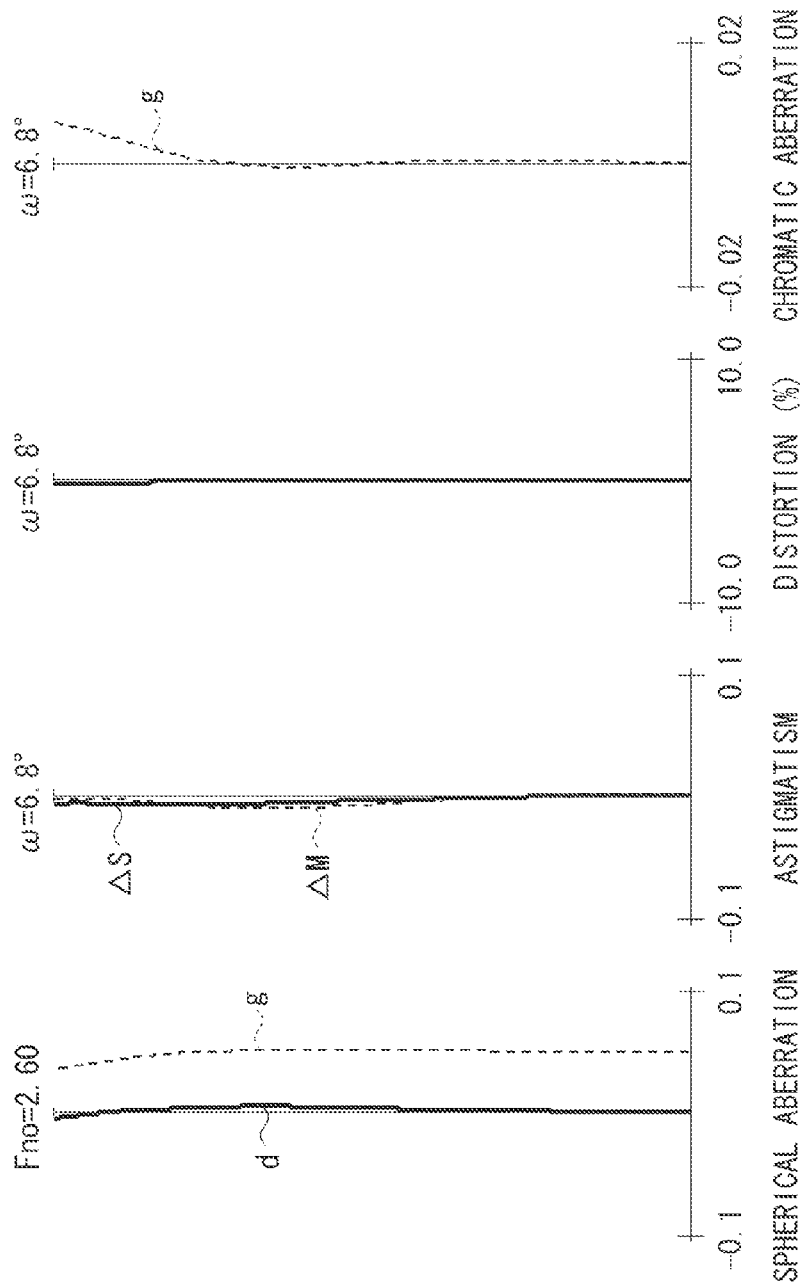

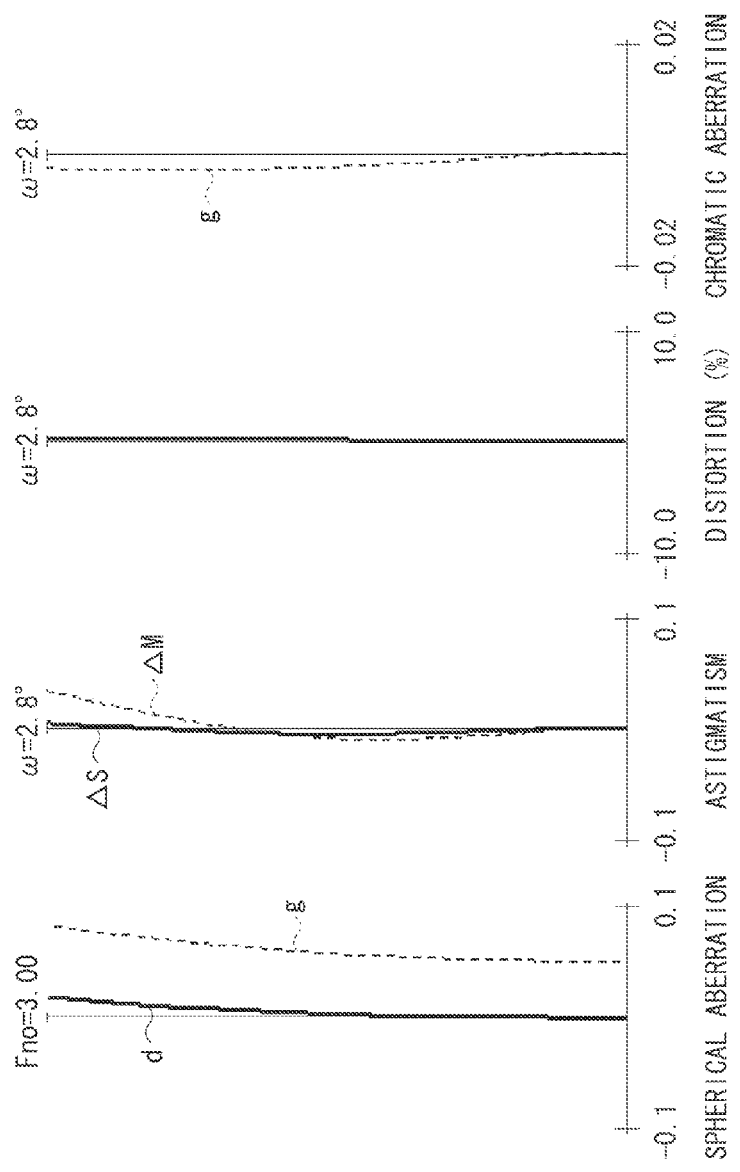

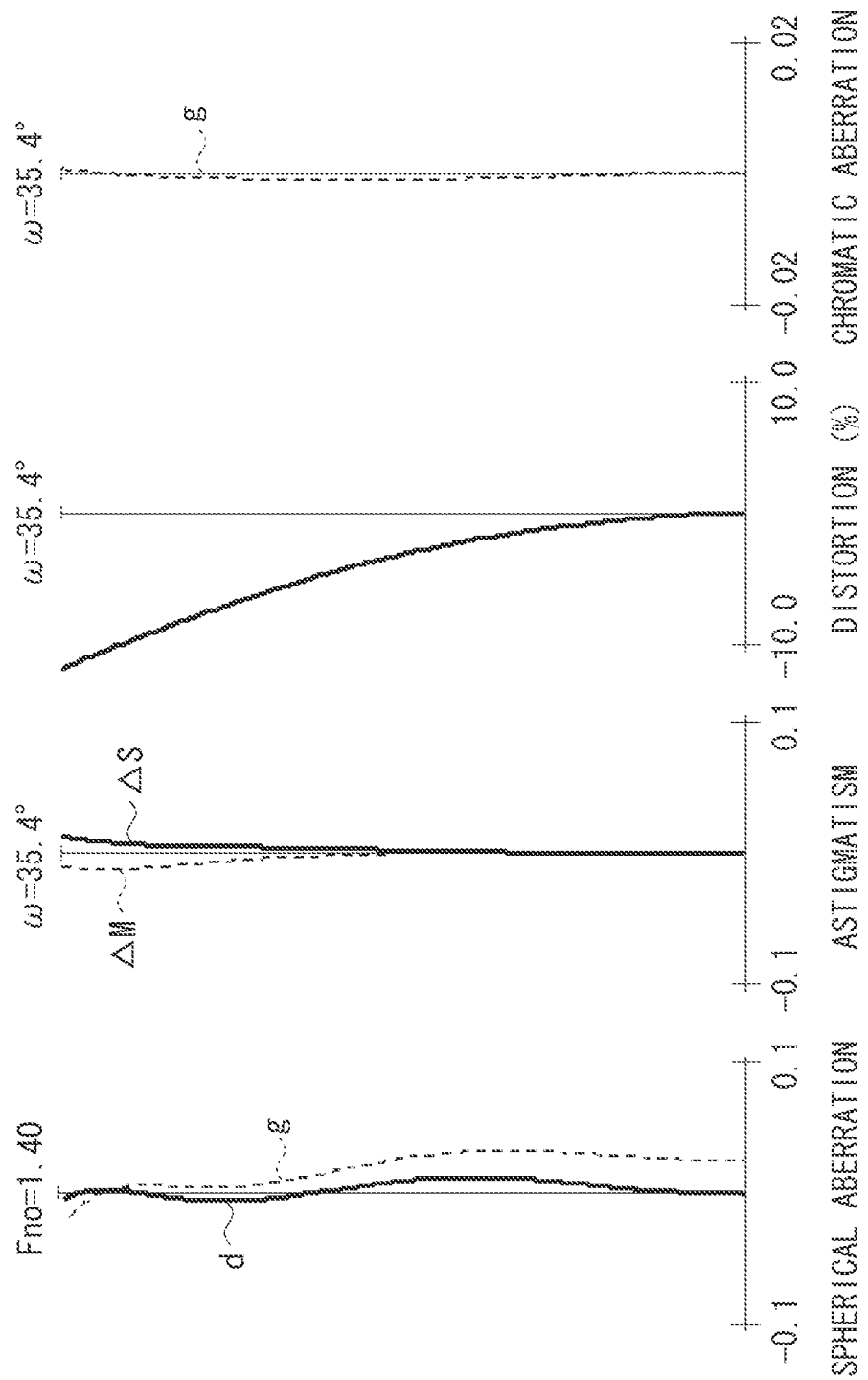

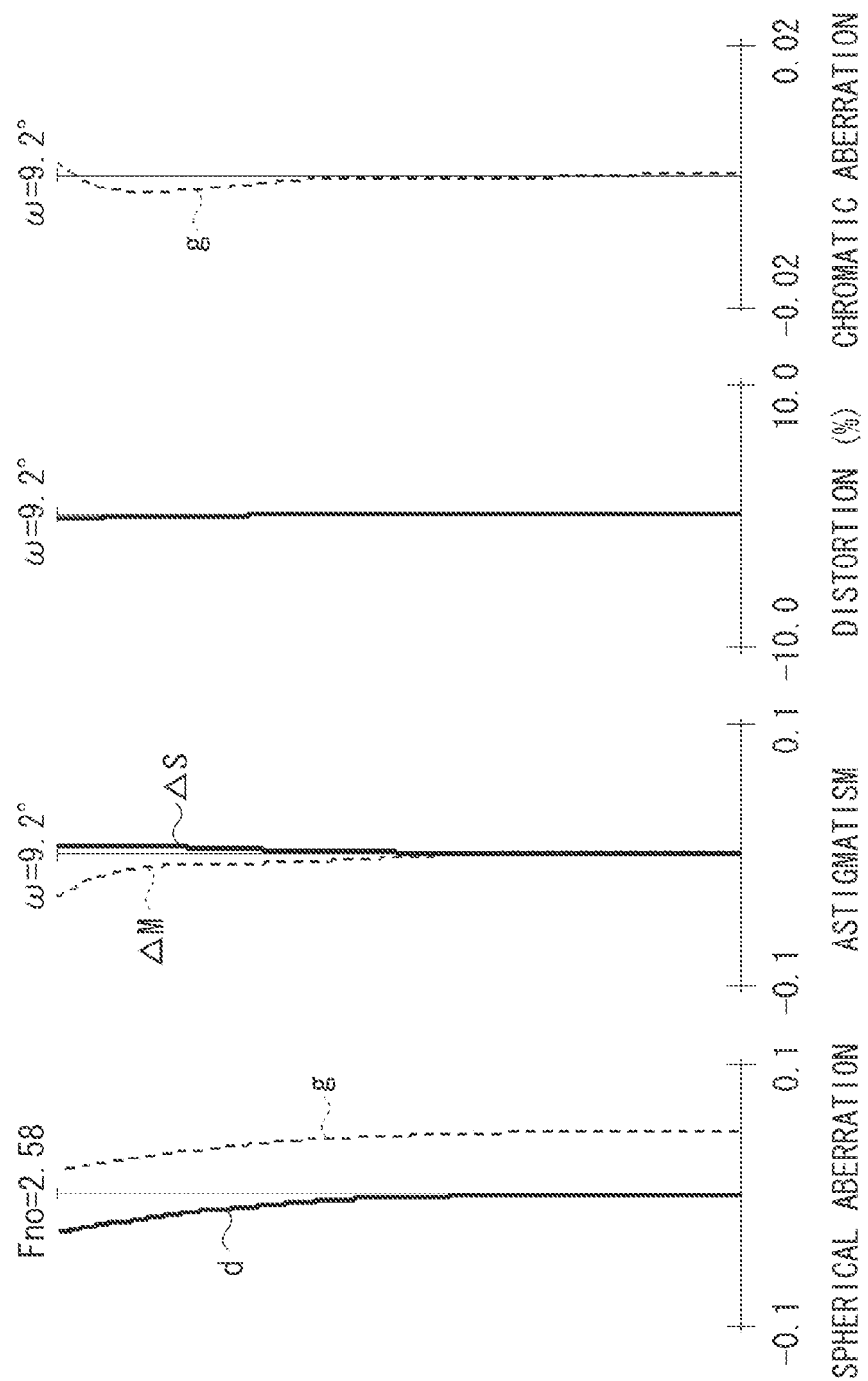

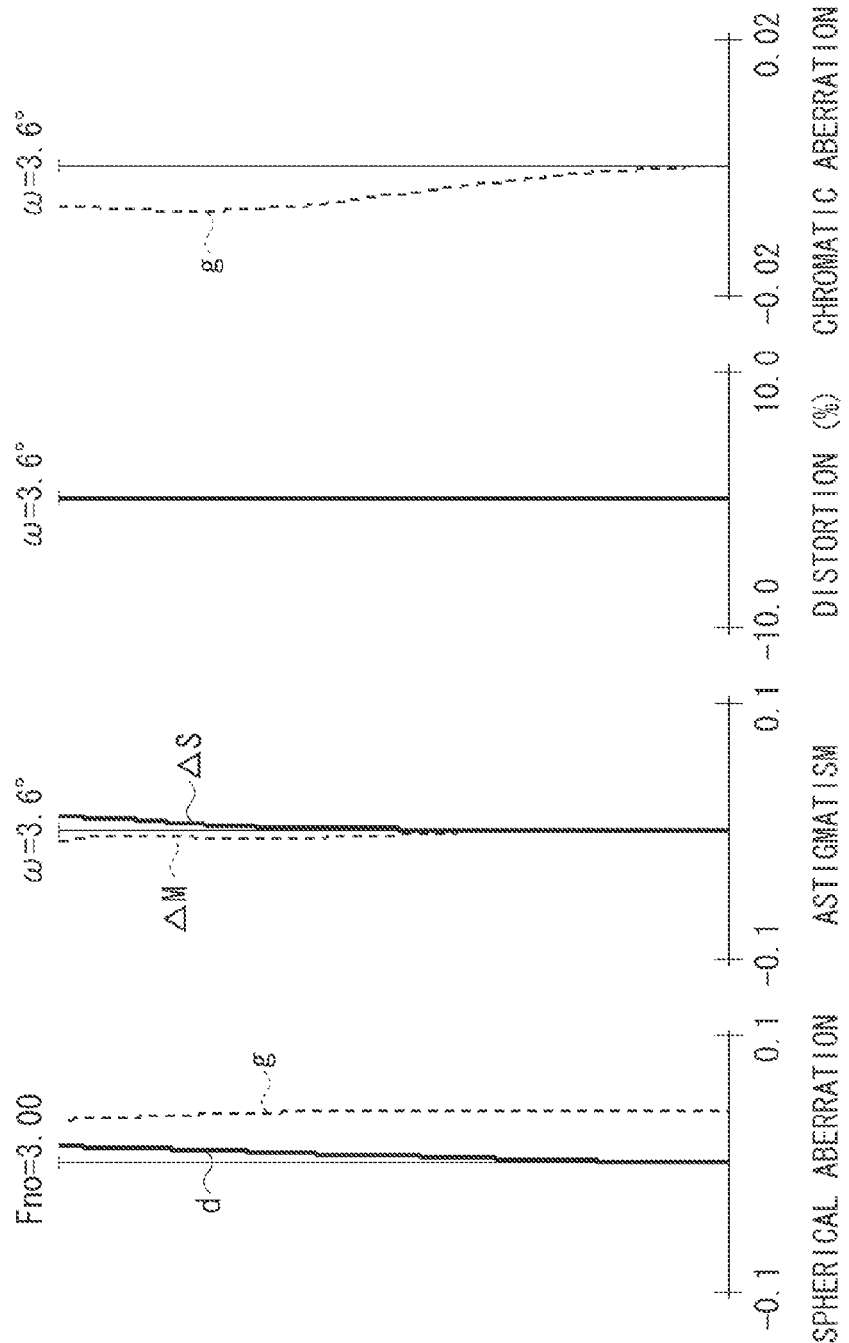

ZOOM LENS AND IMAGE PICKUP APPARATUS EQUIPPED WITH THE SAME

BACKGROUND OF THE INVENTION

1. Field of the Invention

The present disclosure relates to a zoom lens and an image pickup apparatus, such as a video camera, a monitoring camera, a digital still camera, or a broadcasting camera, quipped with the zoom lens.

2. Description of the Related Art

A zoom lens used in an image pickup apparatus, such as a video camera or a monitoring camera, is required to have a large aperture, to be able to easily perform image shake correction, and to contribute to miniaturization of a lens barrel structure.

Japanese Patent Application Laid-Open No. 2007-052374 discusses a zoom lens including, in order from an object side to an image side, a first lens unit having positive refractive power, a second lens unit having negative refractive power, a third lens unit having positive refractive power, and a fourth lens unit having positive refractive power, in which the third lens unit is divided into a first lens sub-unit having positive refractive power and a second lens sub-unit having negative refractive power, and image shake correction is performed by the first lens sub-unit, which is composed of a single positive lens. Such a four-unit zoom lens discussed in Japanese Patent Application Laid-Open No. 2007-052374 performs image shake correction by using one lens element, thus achieving miniaturization of the entire image pickup apparatus. However, since an axial light flux is made into a diverged light flux by the second lens unit having negative refractive power to be incident on the third lens unit, an effective aperture of the single lens that performs image shake correction cannot be sufficiently reduced in diameter.

Japanese Patent Application Laid-Open No. 2005-148437 discusses a zoom lens including, in order from an object side to an image side, a first lens unit having positive refractive power, a second lens unit having negative refractive power, a third lens unit having positive refractive power, and a fourth lens unit having positive refractive power, in which the third lens unit is divided into a first lens sub-unit having positive refractive power, a second lens sub-unit having negative refractive power, and a third lens sub-unit, and image shake correction is performed by the second lens sub-unit, which is a single lens having negative refractive power. in such a four-unit zoom lens discussed in Japanese Patent Application Laid-Open No. 2005-148437, since image shake correction is performed moving only the second lens sub-unit while fixing the first lens sub-unit and the third lens sub-unit, a lens barrel structure is complicated, and as a result, miniaturization cannot be significantly achieved.

SUMMARY OF THE INVENTION

An embodiment of the present invention is directed to a zoom lens in which a lens barrel structure is small-sized, an aberration variation during image shake correction is excellently corrected, and a high optical performance is acquired with a large aperture, and is also directed to an image pickup apparatus equipped with the same.

According to an aspect of the present invention, a zoom lens includes, in order from an object side to an image side, a first lens unit having positive refractive power, a second lens unit having negative refractive power, an aperture stop, a third lens unit having positive refractive power, and a fourth lens unit having positive refractive power, wherein the second lens unit, the aperture stop, and the fourth lens unit move during zooming from a wide-angle end to a telephoto end, wherein the third lens unit includes, in order from the object side to the image side, a first lens sub-unit having positive refractive power and a second lens sub-unit having negative refractive power, wherein the second lens sub-unit is movable in a direction having a component perpendicular to an optical axis to change an image forming position in a direction perpendicular to the optical axis, and wherein, when a distance between the aperture stop and the third lens unit at the wide-angle end is denoted by Ds3$w$, a composite focal length of the first lens unit and the second lens unit at the wide-angle end is denoted by f12$w$, a focal length of the first lens sub-unit is denoted by f3$a$, and a focal length of the second lens sub-unit is denoted by f3$b$, the following conditions are satisfied:

$0.9 < Ds3w/|f12w| < 3.0$ $0.8 < |f3b|/f3a < 2.0$.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B, and 2C are aberration diagrams at the wide-angle end, a middle zoom position, and a telephoto end, respectively, of the zoom lens according to the first exemplary embodiment.

FIGS. 4A, 4B, and 4C are aberration diagrams at the wide-angle end, a middle zoom position, and a telephoto end, respectively, of the zoom lens according to the second exemplary embodiment.

FIGS. 6A, 6B, and 6C are aberration diagrams at the wide-angle end, a middle zoom position, and a telephoto end, respectively, of the zoom lens according to the third exemplary embodiment.

FIGS. 8A, 8B, and 8C are aberration diagrams at the wide-angle end, a middle zoom position, and a telephoto end, respectively, of the zoom lens according to the fourth exemplary embodiment.

FIGS. 10A, 10B, and 10C are aberration diagrams at the wide-angle end, a middle zoom position, and a telephoto end, respectively, of the zoom lens according to the fifth exemplary embodiment.

DESCRIPTION OF THE EMBODIMENTS

Various exemplary embodiments, features, and aspects of the invention will be described in detail below with reference to the drawings.

Hereinafter, a zoom lens and an image pickup apparatus equipped with the same according to exemplary embodiments of the present invention will be described. The zoom lens according to the exemplary embodiment of the present invention includes, in order from an object side to an image side, a first lens unit having positive refractive power, a second lens unit having negative refractive power, an aperture stop, a third lens unit having positive refractive power, and a fourth lens unit having positive refractive power. During zooming (variable magnification) from a wide-angle end to a telephoto end, the first lens unit and the third lens unit are stationary, and the second lens unit, the aperture stop, and the fourth lens unit move.

More specifically, during zooming from the wide-angle end (short focal length end) to the telephoto end (long focal length end), the first lens unit is stationary and the second lens unit moves toward the image side. The aperture stop moves along a locus convex toward the object side, the third lens unit is stationary, and the fourth lens unit moves along a locus convex toward the object side.

Figure 1:
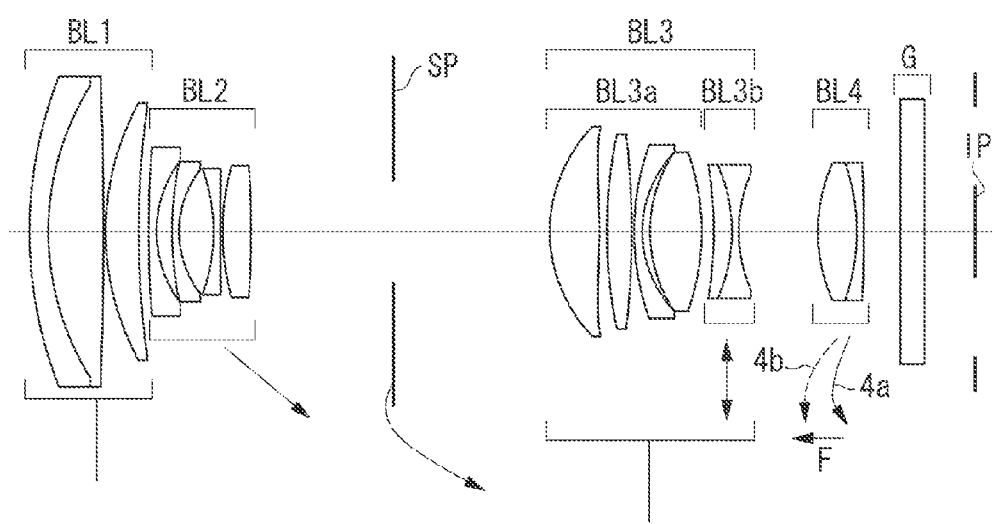
FIG. 1 is a lens cross-sectional view at a wide-angle end of a zoom lens according to a first exemplary embodiment.
Figure 3:
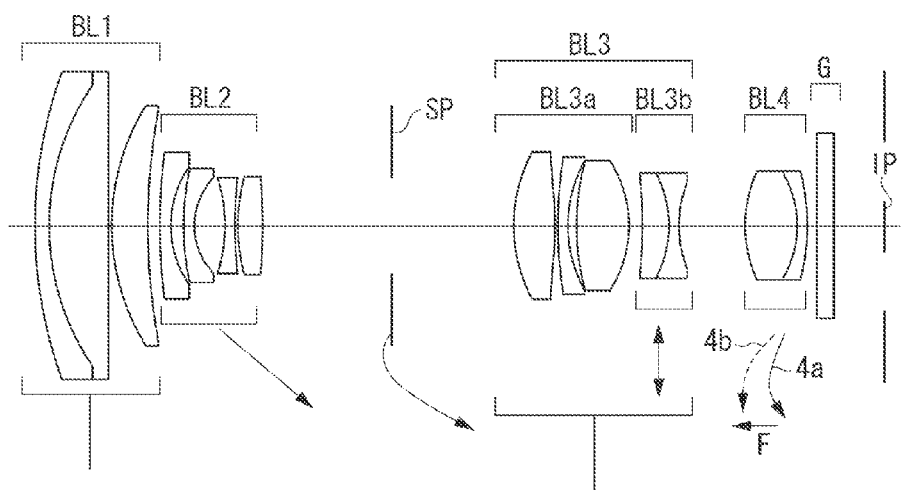
FIG. 3 is a lens cross-sectional view at a wide-angle end of a zoom lens according to a second exemplary embodiment.
Figure 4A:
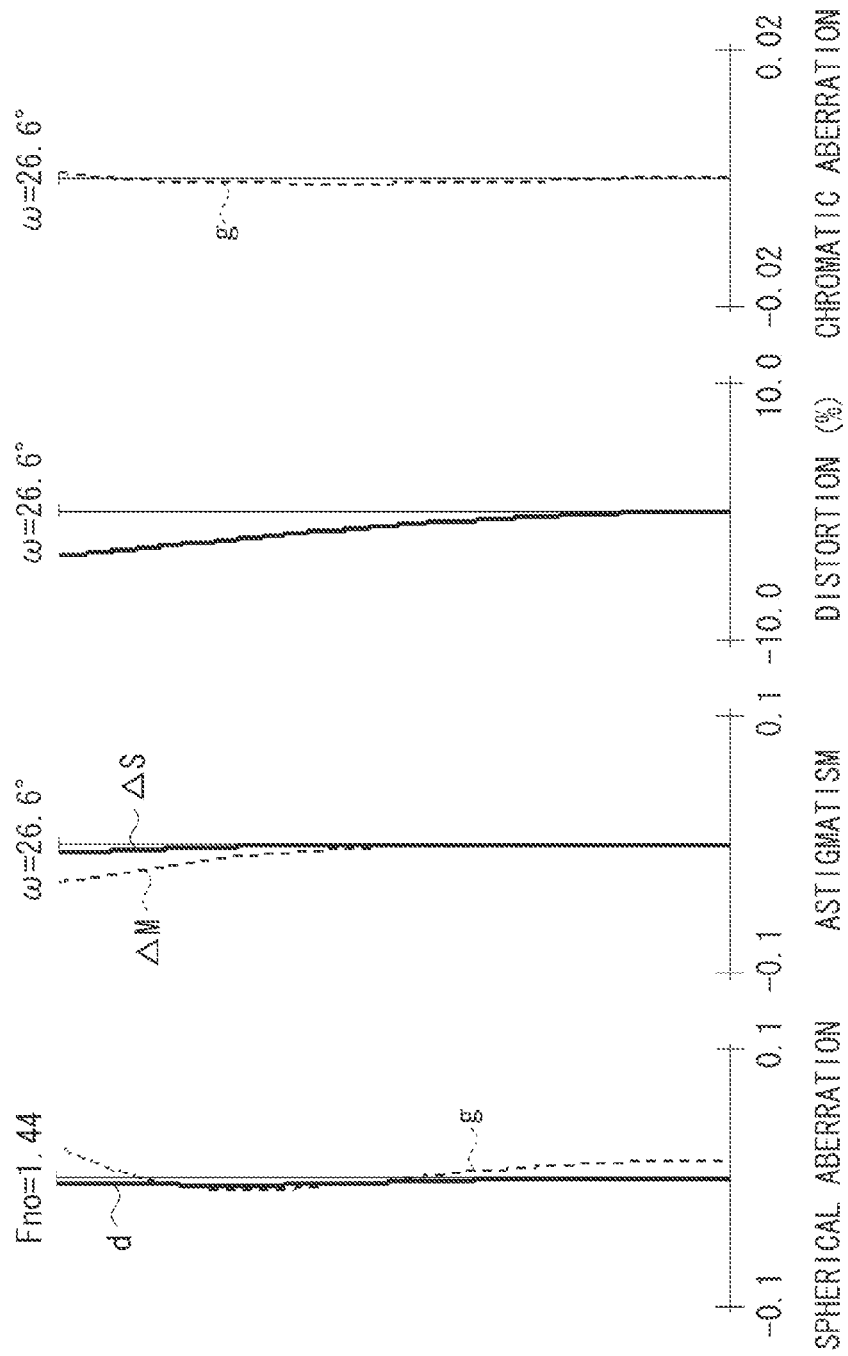
Figure 4B:
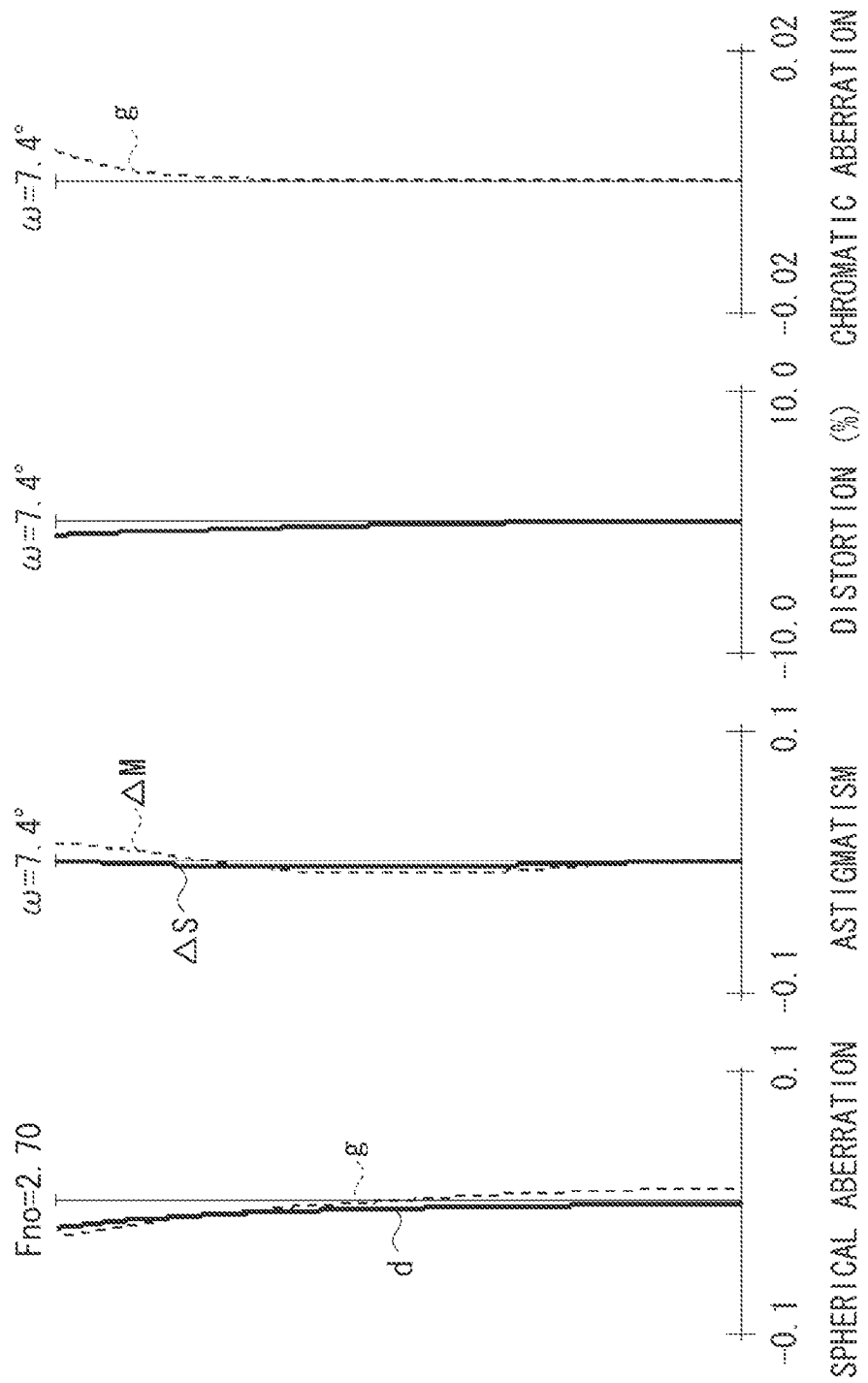

FIG. 1 is a lens cross-sectional view at a wide-angle end of a zoom lens according to a first exemplary embodiment. FIGS. 2A, 2B, and 2C are aberration diagrams at the wide-angle end, a middle zoom position, and a telephoto end, respectively, of the zoom lens according to the first exemplary embodiment. The first exemplary embodiment is a zoom lens in which a zoom ratio is 9.79 and an aperture ratio is approximately in the range of 1.44 to 3.00. FIG. 3 is a lens cross-sectional view at a wide-angle end of a zoom lens according to a second exemplary embodiment. FIGS. 4A, 4B, and 4C are aberration diagrams at the wide-angle end, a middle zoom position, and a telephoto end, respectively, of the zoom lens according to the second exemplary embodiment. The second exemplary embodiment is a zoom lens in which a zoom ratio is 9.78 and an aperture ratio is approximately in the range of 1.44 to 3.00.

Figure 5:
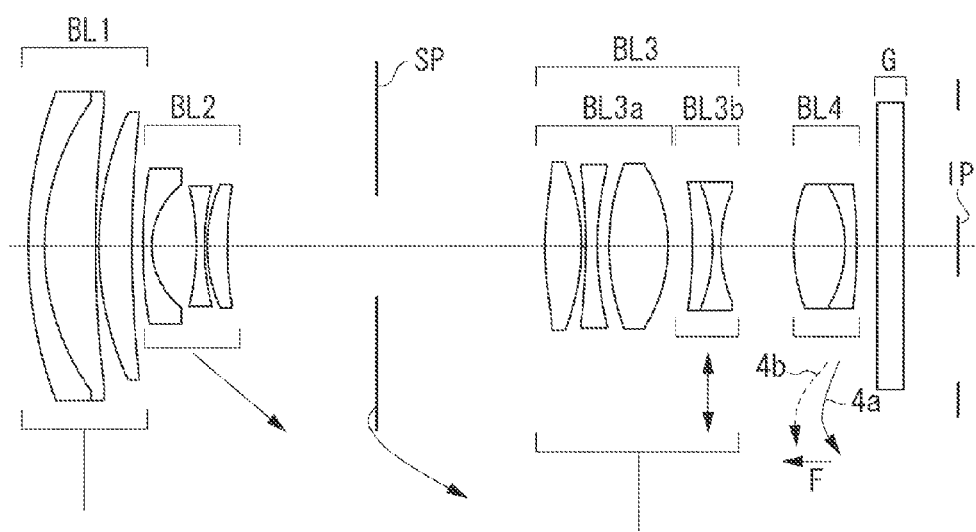
FIG. 5 is a lens cross-sectional view at a wide-angle end of a zoom lens according to a third exemplary embodiment.
Figure 6C:
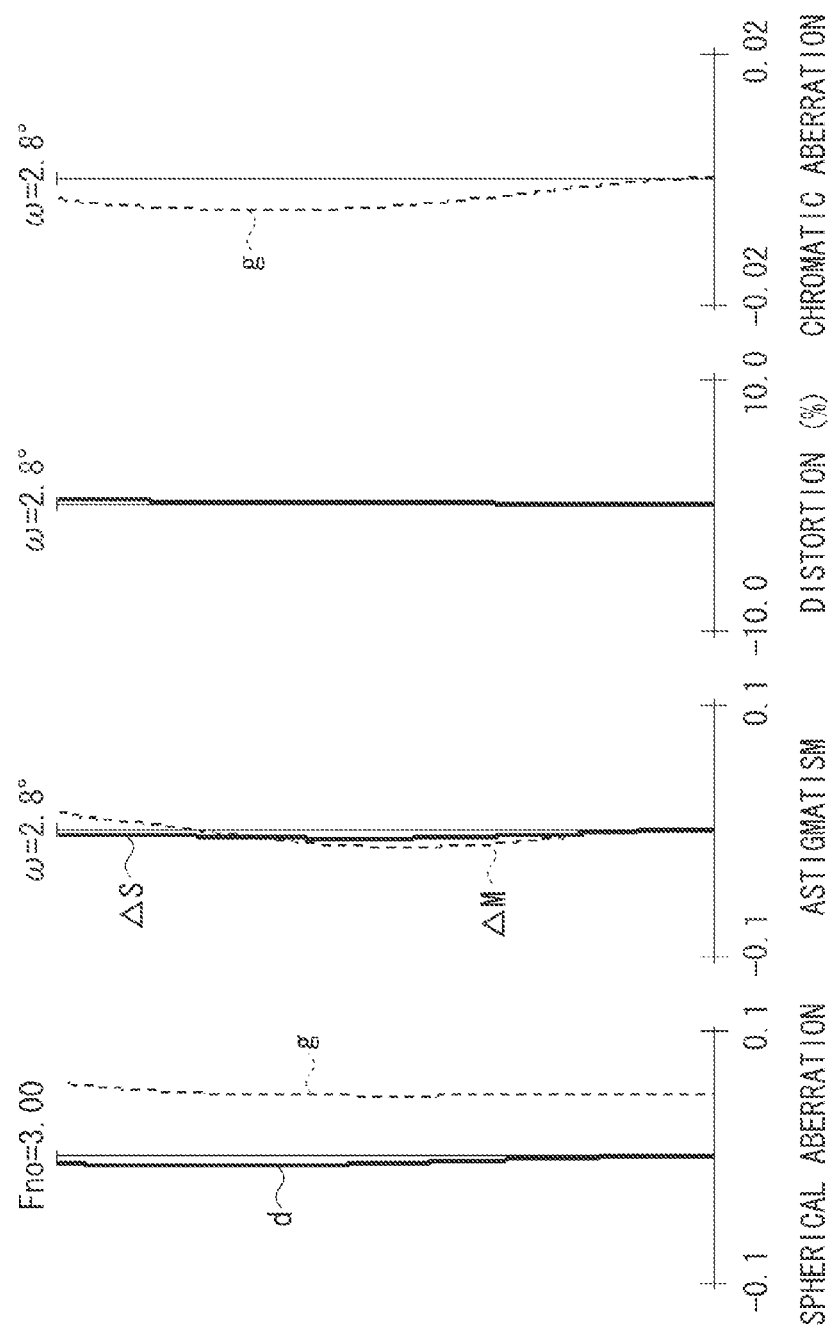
Figure 7:
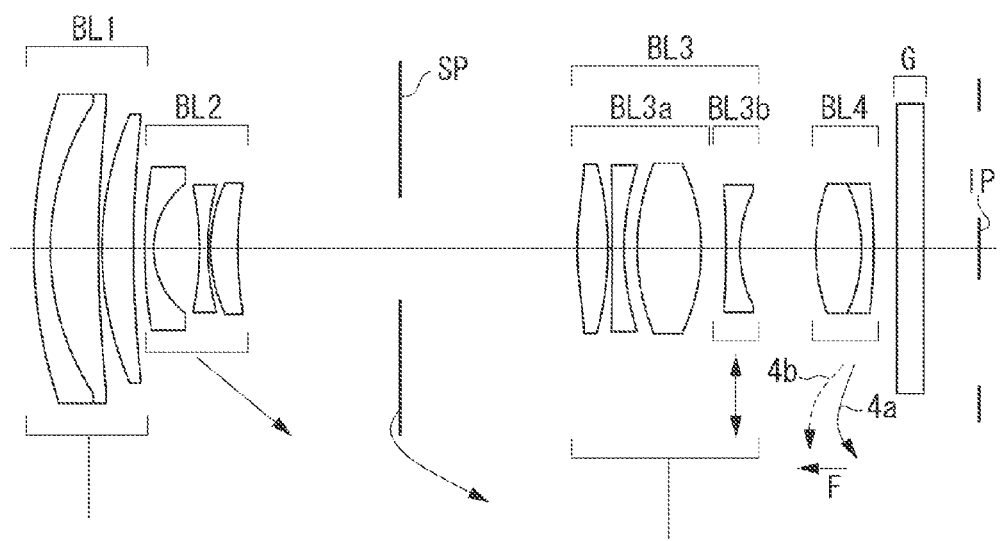
FIG. 7 is a lens cross-sectional view at a wide-angle end of a zoom lens according to a fourth exemplary embodiment.
Figure 8A:
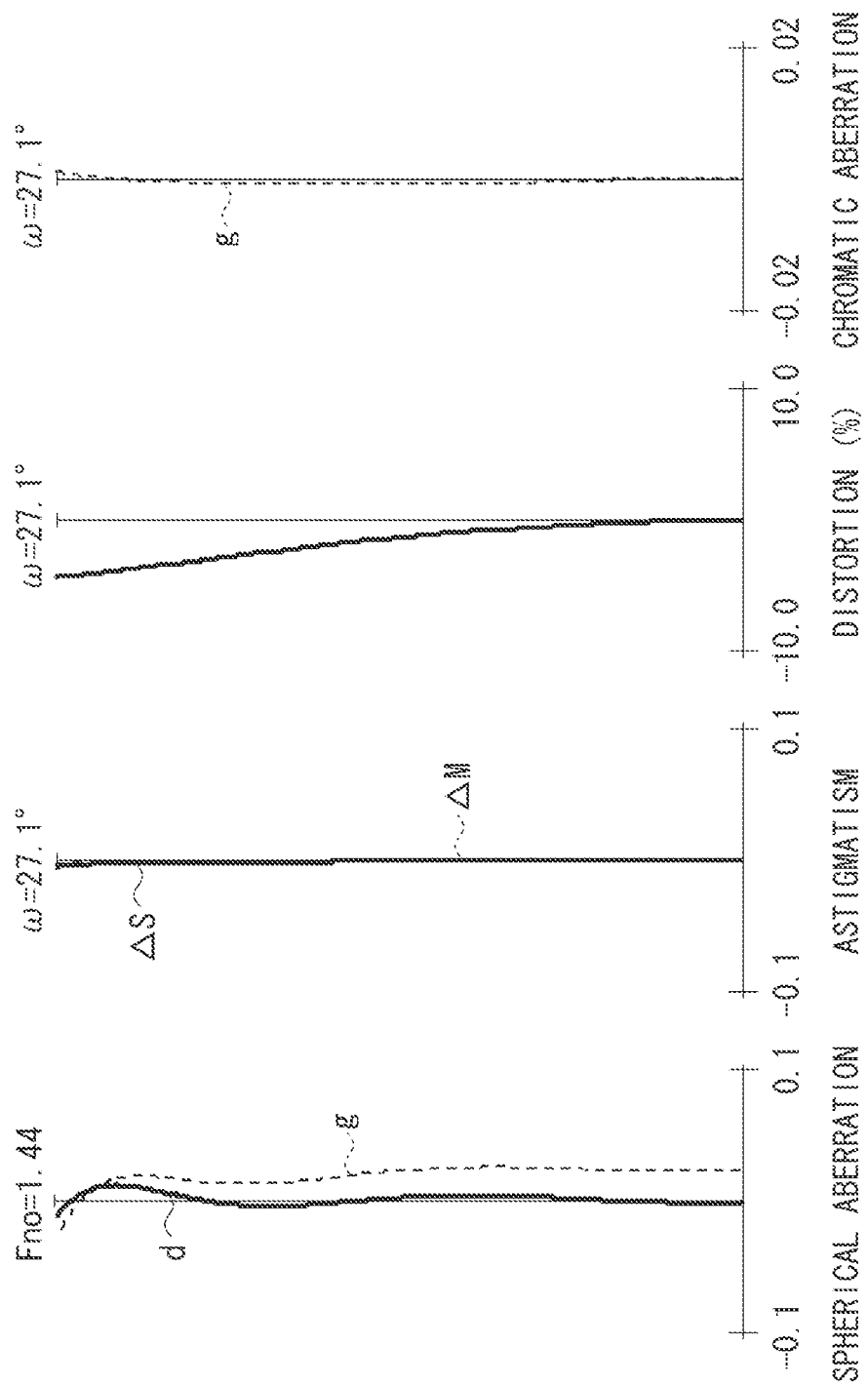

FIG. 5 is a lens cross-sectional view at a wide-angle end of a zoom lens according to a third exemplary embodiment. FIGS. 6A, 6B, and 6C are aberration diagrams at the wide-angle end, a middle zoom position, and a telephoto end, respectively, of the zoom lens according to the third exemplary embodiment. The third exemplary embodiment is a zoom lens in which a zoom ratio is 9.95 and an aperture ratio is approximately in the range of 1.44 to 3.00. FIG. 7 is a lens cross-sectional view at a wide-angle end of a zoom lens according to a fourth exemplary embodiment. FIGS. 8A, 8B, and 8C are aberration diagrams at the wide-angle end, a middle zoom position, and a telephoto end, respectively, of the zoom lens according to the fourth exemplary embodiment. The fourth exemplary embodiment is a zoom lens in which a zoom ratio is 9.97 and an aperture ratio is approximately in the range of 1.44 to 3.00.

Figure 9:
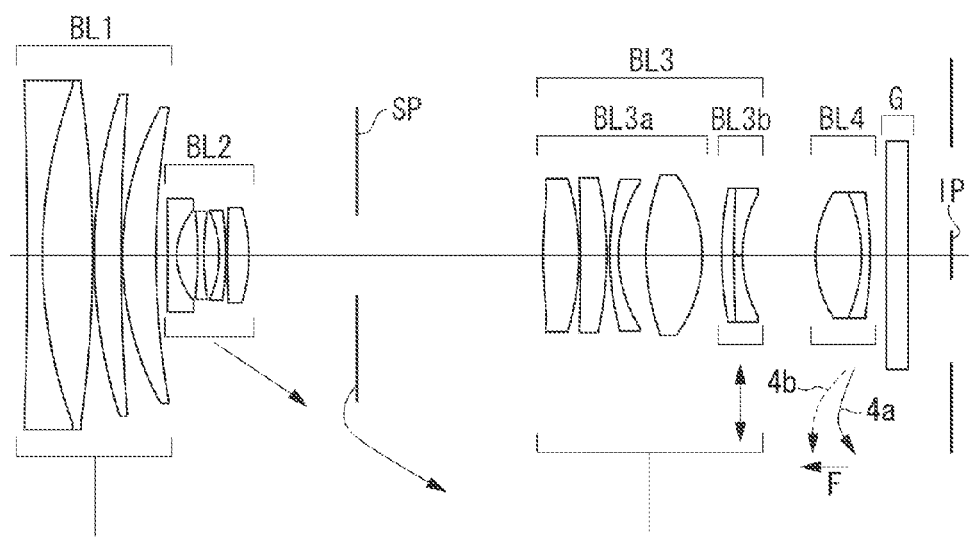
FIG. 9 is a lens cross-sectional view at a wide-angle end of a zoom lens according to a fifth exemplary embodiment.

FIG. 9 is a lens cross-sectional view at a wide-angle end of a zoom lens according to a fifth exemplary embodiment. FIGS. 10A, 10B, and 10C are aberration diagrams at the wide-angle end, a middle zoom position, and a telephoto end, respectively, of the zoom lens according to the fifth exemplary embodiment. The fifth exemplary embodiment is a zoom lens in which a zoom ratio is 10.04 and an aperture ratio is approximately in the range of 1.40 to 3.00.

Figure 11:
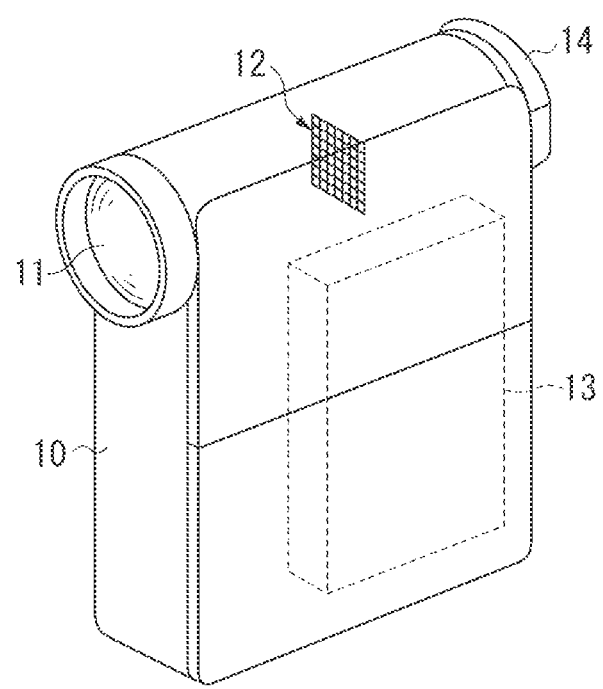
FIG. 11 is a schematic diagram illustrating main components of a video camera according to an exemplary embodiment of the present invention.

FIG. 11 is a schematic diagram illustrating main components of a monitoring camera (image pickup apparatus) equipped with a zoom lens according to an exemplary embodiment of the present invention. The zoom lens of each exemplary embodiment is an imaging lens system used in an image pickup apparatus, such as a video camera, a digital still camera, a silver-halide film camera, a television camera, or the like. In the lens cross-sectional view, the left side is the object side (front side) and the right side is the image side (rear side). Further, in the lens cross-sectional view, when i denotes the order of lens units from the object side, BLi represents the i-th lens unit.

The zoom lens of each exemplary embodiment includes, in order from the object side to the image side, a first lens unit BL1 having positive refractive power, a second lens unit BL2 having negative refractive power, a third lens unit BL3 having positive refractive power, and a fourth lens unit BL4 having positive refractive power. The zoom lens in each exemplary embodiment is a positive-lead type four-unit zoom lens having four lens units.

An optical block G corresponds to an optical filter, a faceplate, a low-pass filter, an infrared cut filter, or the like. IP represents an image plane. When the zoom lens is used as an imaging optical system of the video camera or the digital camera, the image plane IP corresponds to a solid-state image sensor (photoelectric conversion element) such as a charge-coupled device (CCD) sensor or a complementary metal-oxide semiconductor (CMOS) sensor. When the zoom lens is used as an imaging optical system of a silver-halide film camera, the image plane IP corresponds to a film surface. An arrow in the lens cross-sectional view indicates a movement locus of each lens unit during zooming from the wide-angle end to the telephoto end.

In a spherical aberration diagram, Fno represents an F-number. Further, a solid line indicates d line (wavelength of 587.6 nm) and a dotted line indicates g line (wavelength 435.8 nm). In an astigmatism diagram, a solid line indicates a sagittal image plane with respect to d line and a dotted line indicates a meridional image plane with respect to d line. Distortion is plotted with respect to d line. In a diagram for chromatic aberration of magnification, an aberration of g line with respect to d line is illustrated. ω represents a half angle of view. Further, the wide-angle end and the telephoto end in each exemplary embodiment below represent zoom positions when a lens unit for variable magnification is positioned at respective ends of a range in which the lens unit for the variable magnification moves on an optical axis under constraints on a mechanism.

In the lens cross-sectional view of each exemplary embodiment, an aperture stop SP is positioned between the second lens unit BL2 and the third lens unit BL3. In general, in order to miniaturize the lens barrel structure, the aperture stop SP is desirably configured to be placed in the vicinity of the third lens unit BL3 or within the third lens unit BL3 and to be stationary during zooming from the wide-angle end to the telephoto end.

Meanwhile, if the diameter of an axial light flux at the wide-angle end is increased to achieve a large aperture, a lens effective diameter of the third lens unit BL3 increases. In this case, when the aperture stop SP is placed in the vicinity of the third lens unit BL3, an effective diameter of the aperture stop SP increases along with a large aperture, and as a result, it is difficult to achieve a small aperture of the aperture stop SP. Therefore, a distance between the aperture stop SP and the third lens unit BL3 is appropriately set by setting the aperture stop SP movable during zooming.

The third lens unit BL3 includes a first lens sub-unit BL3a having positive refractive power and a second lens sub-unit BL3b having negative refractive power. The second lens sub-unit BL3b includes one lens element (a cemented lens of a positive lens and a negative lens, or one negative lens). In addition, an image forming position is moved in a direction perpendicular to an optical axis by moving the second lens sub-unit BL3b in a direction perpendicular to the optical axis to perform image shake correction.

In order to excellently correct an aberration variation during image shake correction, only the second lens sub-unit BL3b is moved having a component perpendicular to the optical axis. If the entire third lens unit BL3 or the first lens sub-unit BL3a is moved having a component perpendicular to the optical axis, it is difficult to miniaturize the lens barrel structure due to an increase in lens diameter of the third lens unit BL3 or an increase in the mass of the third lens unit BL3.

Further, in order to miniaturize the lens barrel structure and to acquire an excellent optical performance, it is important to appropriately set a balance in refractive power between the first lens sub-unit BL3a and the second lens sub-unit BL3b.

In regard to focusing, a rear focusing method to perform focusing by moving the fourth lens unit BL4 on the optical axis is adopted. When focusing is performed to a close object from an infinitely-distant object at the telephoto end, focusing is achieved by continuously forwarding the fourth lens unit BL4 toward the object side, as indicated by an arrow F in the lens cross-sectional view. A curve 4a in the lens cross-sectional view represents a movement locus for correcting an image plane variation caused by zooming to the telephoto end from the wide-angle end when focusing is made on the infinitely-distant object. A curve 4b represents a movement locus for correcting the image plane variation caused by zooming to the telephoto end from the wide-angle end when focusing is made on the close object. Herein, a space between the third lens unit BL3 and the fourth lens unit BL4 is effectively utilized by moving the fourth lens unit BL4 along a locus convex toward the object side, thereby decreasing the total lens length.

Herein, a distance between the aperture stop SP and the third lens unit BL3 on the optical axis (a distance between the aperture stop SP and a lens surface of the third lens unit BL3 which is closest to the object side on the optical axis) at the wide-angle end is denoted by Ds3w, and a composite focal length of the first lens unit BL1 and the second lens unit BL2 at the wide-angle end is denoted by f12w. Further, when a focal length of the first lens sub-unit BL3a is denoted by f3a, and a focal length of the second lens sub-unit BL3b is denoted by f3b, each exemplary embodiment satisfies the following conditions:

$$0.9 < Ds3w/|f12w| < 3.0 \quad (1)$$

$$0.8 < |f3b|/f3a < 2.0 \quad (2)$$

The condition (1) defines a relationship between a composite refractive power of the first lens unit BL1 and the second lens unit BL2 at the wide-angle end and the position of the aperture stop SP. When the upper limit value of the condition (1) is exceeded and thus an absolute value of the composite focal length f12w decreases (when the negative refractive power is increased), it is advantageous to achieving a wide angle of view, but it is not desirable because various aberrations become larger and a marginal light amount is decreased. When the distance Ds3w between the aperture stop SP and the third lens unit BL3 decreases with the lower limit value of the condition (1) exceeded, the aperture stop SP is made close to the third lens unit BL3, and as a result, the lens diameter of the third lens unit BL3 needs to be increased to achieve a large aperture. Therefore, as the diameter of the aperture stop SP needs to be increased, it is difficult to miniature the lens barrel structure.

The condition (2) is used to appropriately set the balance between the refractive power of the first lens sub-unit BL3a and the refractive power of the second lens sub-unit BL3b, which performs image shake correction. When the refractive power of the first lens sub-unit BL3a is increased with the upper limit value of the condition (2) exceeded, a converging operation acts on an axial light beam passing through the first lens sub-unit BL3a, which is advantageous to a reduction in aperture of the second lens sub-unit BL3b, but spherical aberration may not be excellently corrected. Further, in the entire zoom range, it is difficult to suppress aberration variation, such as spherical aberration or astigmatism. When the refractive power of the first lens sub-unit BL3a is decreased with the lower limit value of the condition (2) exceeded, it is difficult to achieve a decrease in diameter of the lens barrel structure with an increase in the lens effective diameter of the second lens sub-unit BL3b due to a large aperture.

In each exemplary embodiment, each element is appropriately set to satisfy the conditions (1) and (2) as described above. Therefore, a zoom lens is acquired, in which the lens barrel structure has a small diameter, the aberration variation in image shake correction is excellently corrected, and a high optical performance with a large aperture is provided.

Further, in each exemplary embodiment, desirably, numerical ranges of the conditions (1) and (2) can be set as follows:

$$0.95 < Ds3w/|f12w| < 2.5 \quad (1a)$$

$$1.0 < |f3b|/f3a < 1.8 \quad (2a)$$

Further, more desirably, the numerical ranges of the conditions (1) and (2) can be set as follows:

$$1.0 < Ds3w/|f12w| < 2.2 \quad (1b)$$

$$1.1 < |f3b|/f3a < 1.6 \quad (2b)$$

Further, in each exemplary embodiment, one or more of the following conditions are more desirably satisfied. Herein, a distance on the optical axis between the first lens unit BL1 and the third lens unit BL3 at the wide-angle end is denoted by D13w. A distance on the optical axis between a lens surface closest to the object side among surfaces of the third lens unit BL3 and a lens surface closest to the object side among surfaces of the second lens sub-unit BL3b is denoted by L3ab. Further, when a distance on the optical axis (a thickness on the optical axis) from the lens surface closest to the object side among the surfaces of the third lens unit BL3 to a lens surface closest to the image side among the surfaces of the third lens unit BL3 is denoted by D3, a focal length of the entire zoom lens at the wide-angle end is denoted by fw, a focal length of the third lens unit BL3 is denoted by f3, and a focal length of the fourth lens unit BL4 is denoted by f4, one or more of the following conditions can be satisfied:

$$1.5 < D13w/Ds3w < 4.0 \quad (3)$$

$$0.6 < L3ab/D3 < 1.0 \quad (4)$$

$$2.0 < |f3b|/fw < 8.0 \quad (5)$$

$$0.8 < f3/|f3b| < 1.6 \quad (6)$$

$$0.9 < f3/f4 < 1.8 \quad (7)$$

The condition (3) is used to appropriately set the position of the aperture stop SP at the wide-angle end. When a value of the distance Ds3w is decreased with the upper limit value of the condition (3) exceeded, the distance between the aperture stop SP and the third lens unit BL3 becomes insufficient. As a result, it is not desirable because the diameter of the stop is increased by achieving a large aperture, and thus it is difficult to achieve a decrease in diameter of the lens barrel structure.

When the value of the distance Ds3w is increased with the lower limit value of the condition (3) exceeded, the distance between the second lens unit BL2 and the aperture stop SP at the wide-angle end becomes insufficient. Herein, since a diverging operation by the second lens unit BL2 is applied to an axial light flux, it is desirable to achieve a decrease in diameter of the aperture stop SP. Meanwhile, an off-axis light flux passes through a position distant from the optical axis around the second lens unit BL2 as compared with the axial light flux. As a result, when the diameter of the aperture stop is excessively decreased, a light flux having a marginal image height is excessively shielded. Therefore, it is not desirable because an appropriate balance between the F-number and the marginal light amount may not be maintained.

The condition (4) is used to set the position of the second lens sub-unit BL3b, performing an image shake correction, in the third lens unit BL3. At the wide-angle end, the diameter of the axial light flux is largest in the first lens sub-unit BL3a. In the condition (4), since the thickness of the third lens unit BL3 on the optical axis is unavoidably larger than the thickness of the second lens sub-unit BL3b on the optical axis, the upper limit value of the condition (4) is never exceeded. When the thickness of the second lens sub-unit BL3b on the optical axis is increased with the lower limit value of the condition (4) exceeded, the diameter of an axial light flux which is incident on the second lens sub-unit BL3b at the wide angle end is increased. As a result, as the lens diameter of the second lens sub-unit BL3b is increased, it is difficult to decrease the diameter of the lens barrel structure.

The condition (5) is used to define the refractive power of the second lens sub-unit BL3b performing an image shake correction. When the refractive power of the second lens sub-unit BL3b is decreased with the upper limit value of the condition (5) exceeded, a shift amount required to perform an image shake correction is increased, and as a result, it is difficult to decrease the diameter of the lens barrel structure. When the refractive power of the second lens sub-unit BL3b is increased with the lower limit value of the condition (5) exceeded, the shift amount required to perform an image shake correction is decreased, and as a result, it is advantageous to a decrease in diameter of the lens barrel structure, but it is not desirable because the Petzval sum is increased in a negative direction and thus curvature of field is excessively corrected.

The condition (6) is used to define the balance between the refractive power of the third lens unit BL3 and the refractive power of the second lens sub-unit BL3b. When the upper limit value of the condition (6) is exceeded, the refractive power of the second lens sub-unit BL3b is excessively stronger than the refractive power of the third lens unit BL3. As a result, it is not desirable because it is difficult to suppress the aberration variation in an image shake correction, and an image quality in the image shake correction deteriorates. When the limit value of the condition (6) is exceeded, the refractive power of the second lens sub-unit BL3b is excessively weaker than the refractive power of the third lens unit BL3. Therefore, it is not desirable because the shift amount required for an image shake correction is increased, and as a result, it is difficult to decrease the diameter of the lens barrel structure.

The condition (7) is used to define the balance between the refractive power of the third lens unit BL3 and the refractive power of the fourth lens unit BL4. When the upper limit value of the condition (7) is exceeded, and as a result, the refractive power of the fourth lens unit BL4 is strong, the aberration variation is increased during zooming from the wide-angle end to the telephoto end. Therefore, it is difficult to secure excellent optical performance. When the lower limit value of the condition (7) is exceeded, and as a result, the refractive power of the fourth lens unit BL4 is weak, a movement amount of the fourth lens unit BL4 is increased during focusing on a close object from an infinitely-distant object, so that the total lens length is increased, which is not desirable.

Further, desirably, numerical ranges of the conditions (3) to (7) can be set as follows:

$$1.8 < D13w/Ds3w < 3.5 \quad (3a)$$

$$0.70 < L3ab/D3 < 0.95 \quad (4a)$$

$$2.2 < |f3b|/fw < 7.0 \quad (5a)$$

$$0.85 < f3/|f3b| < 1.5 \quad (6a)$$

$$1.0 < f3/f4 < 1.6 \quad (7a)$$

Further, more desirably, the numerical ranges of the conditions (3) to (7) can be set as follows:

$$2.0 < D13w/Ds3w < 3.2 \quad (3b)$$

$$0.75 < L3ab/D3 < 0.93 \quad (4b)$$

$$2.5 < |f3b|/fw < 6.5 \quad (5b)$$

$$0.9 < f3/f3b < 1.4 \quad (6b)$$

$$1.1 < f3/f4 < 1.5 \quad (7b)$$

In each exemplary embodiment, each element is configured as described above, and as a result, a zoom lens is acquired in which the lens barrel structure is simple and has a small diameter, the aberration variation in an image shake correction is excellently corrected, and high optical performance in the large aperture is provided. Further, the above conditions are arbitrarily combined in plural to thereby further improve the effect of an embodiment of the present invention.

Next, a lens configuration of each exemplary embodiment will be described. In each exemplary embodiment, the first lens sub-unit BL3a includes one or more positive lenses and one or more negative lenses. As a result, chromatic aberration which occurs in the first lens sub-unit BL3a is corrected and the excellent optical performance at the wide-angle end can be secured. Further, aberration of the first lens sub-unit BL3a, which is positioned around the second lens sub-unit BL3b performing an image shake correction, is corrected well to reduce the occurrence of aberration caused by the image shake correction. Hereinafter, a detailed lens configuration of each exemplary embodiment for each lens unit will be described. As long as not otherwise stated, the lens units or lens sub-units are placed in order from the object side to the image side.

The first lens unit BL1 is configured as follows. In the first to fourth exemplary embodiments, the first lens unit BL1 includes a cemented lens in which a negative lens and a positive lens are cemented to each other, and a positive lens having a surface at the object side which is convex and having a meniscus shape. In the fifth exemplary embodiment, the first lens unit BL1 includes a cemented lens in which a negative lens and a positive lens are cemented to each other, a positive lens having a surface at the object side which is convex and having a meniscus shape, and a positive lens having a surface at the object side which is convex and having a meniscus shape. The positive refractive power in the first lens unit BL1 is shared by the cemented lens and one or two positive lenses to reduce various aberrations which occur in the first lens unit BL1, particularly, spherical aberration at the telephoto side.

The second lens unit BL2 is configured as follows. In the first, second, and fifth exemplary embodiments, the second lens unit BL2 includes a negative lens having a surface at the image side which is concave, a negative lens having a surface at the image side which is concave, a negative lens having a surface at the object side which is concave, and a positive lens having a surface at the object side which is convex. In the third and fourth exemplary embodiments, the second lens unit BL2 includes a negative lens having a surface at the image side which is concave, a negative lens having a biconcave shape, and a positive lens having a surface at the object side which is convex. Herein, the refractive power of the second lens unit BL2 is strengthened to decrease the effective diameter of the first lens unit BL1 while achieving a wide angle of view. The negative refractive power in the second lens unit BL2 is shared by two or three negative lenses to reduce occurrence of curvature of field or distortion at the wide-angle end. Further, a high-dispersive material in which an Abbe number is smaller than 20 is used in the positive lens, and as a result, the refractive power of the lens required for achromatizing is reduced as much as possible. By this configuration, miniaturization is implemented while suppressing the occurrence of curvature of field or chromatic aberration of magnification.

Further, in each exemplary embodiment, the aperture stop SP is placed between the second lens unit BL2 and the third lens unit BL3, and in particular, the aperture stop SP at the wide-angle end is placed to be as closer to the object side as possible to thereby decrease the diameter of the stop at the wide-angle end.

The third lens unit BL3 includes a first lens sub-unit BL3a having positive refractive power and a second lens sub-unit BL3b having negative refractive power. The first lens sub-unit BL3a has the following configuration in each exemplary embodiment. In the first exemplary embodiment, the first lens sub-unit BL3a includes a positive lens having both surfaces with an aspheric shape and having a biconvex shape, a positive lens having a biconvex shape, a negative lens having a surface at the image side which is concave, and a positive lens having a biconvex shape. In the second exemplary embodiment to the fourth exemplary embodiment, the first lens sub-unit BL3a includes a positive lens having both surfaces with an aspheric shape and having a biconvex shape, a negative lens having a surface at the image side which is concave, and a positive lens having a biconvex shape. In the fifth exemplary embodiment, the first lens sub-unit BL3a includes a positive lens having a surface at the object side which has an aspheric shape and having a biconvex shape, a positive lens having a surface at the image side which is convex, a negative lens having a surface at the image side which is concave, and a positive lens having a surface at the image side which has an aspheric shape and having a biconvex shape.

In the first, second, and fifth exemplary embodiments, achromatizing is performed by three positive lenses and a negative lens using a high-dispersive glass material in which an Abbe number is smaller than 30 to reduce axial chromatic aberration. Further, in the first to fourth exemplary embodiments, both surfaces of the positive lens which is closest to the object side have an aspheric shape, and as a result, spherical aberration at the wide-angle end is corrected and a variation of various aberrations which occur during zooming is suppressed.

The second lens sub-unit BL3b is configured as follows in each exemplary embodiment. In the first to third exemplary embodiments, the second lens sub-unit BL3b includes a cemented lens composed of a positive lens and a negative lens having a surface at the image side which is concave. In the fourth exemplary embodiment, the second lens sub-unit BL3b includes one negative lens having a surface at the image side which is concave. In the fifth exemplary embodiment, the second lens sub-unit BL3b includes a cemented lens composed of a positive lens and a negative lens having a surface at the image side which is concave.

The fourth lens unit BL4 includes a cemented lens composed of a positive lens and a negative lens, which has a positive refractive power on the whole. As a result, a variation of chromatic aberration which occurs when image-plane variation caused by zooming is corrected is suppressed.

Further, in each exemplary embodiment, a material of an aspheric lens is not limited to a glass material, and a hybrid type aspheric lens in which an aspheric surface is formed of a resin material (an aspheric component is added) on a spherical lens made of glass material or an aspheric lens formed by plastic molding may be used.

As described above, although the exemplary embodiments of the present invention have been described, the present invention is not limited to the exemplary embodiments and various modifications or changes can be made within the scope of the spirit. Further, distortion can be electrically corrected by a signal processing circuit that processes image data from a solid-state image sensor (photoelectric conversion element) to output an image having less distortion.

Next, an exemplary embodiment of a video camera using the zoom lens according to the exemplary embodiment of the present invention as a photographic optical system will be described with reference to FIG. 11. In FIG. 11, the video camera includes a video camera body 10, a photographic optical system 11 constituted by any one zoom lens described in the first to fifth exemplary embodiments, a solid-state image sensor (photoelectric conversion element) 12, such as a CCD sensor a CMOS sensor, that is incorporated in the camera body to receive an object image formed by the photographic optical system 11, a recording unit 13 that records information corresponding to the object image which is photoelectrically converted by the solid-state image sensor 12, and a viewfinder 14 for observing an object image displayed on a display element (not illustrated).

As such, the zoom lens according to the exemplary embodiment of the present invention is applied to the image pickup apparatus such as a video camera, or the like to acquire an image pickup apparatus having a lens barrel structure having a small diameter and high optical performance.

Next, numerical examples 1 to 5 corresponding to the first to fifth exemplary embodiments of the present invention, respectively, will be described. In each numerical example, i represents the order of an optical surface counted from the object side. ri represents a radius of curvature of an i-th optical surface (i-th surface), di represents a distance between the i-th surface and an (i+1)th surface, and ndi and vdi represent a refractive index and an Abbe number of a material of an i-th optical member for d line, respectively. Further, when k represents eccentricity, A4, A5, A6, A7, and A8 represent aspheric coefficients, and a displacement in an optical axial direction at a position of a height h from the optical axis is denoted by x based on a surface vertex, the aspheric shape is expressed by $$x=(h^2/R)/[1+\{1-(1+k)(h/R)^2\}^{1/2}]+A4h^4+A5h^5+A6h^6+A7h^7+A8h^8,$$

where R represents a paraxial radius of curvature.

In the numerical examples, two surfaces closest to the image side are surfaces of optical blocks such as a filter, a faceplate, and the like. SP represents the aperture stop (alternatively, an iris stop), and G represents a glass block, such as a crystal low-pass filter or an infrared cut filter. IP represents an image plane on which a photosensitive surface of the solid-state image sensor (photoelectric conversion element), such as a CCD sensor or a CMOS sensor, is positioned. Further, the relationship between each numerical example and the aforementioned conditions are set forth in Table 1.

Numerical Example 1

Unit mm

Surface data

| Surface number | r | d | nd | vd |
|---|---|---|---|---|
| 1 | 33.930 | 1.50 | 1.84666 | 23.9 |
| 2 | 22.066 | 4.38 | 1.48749 | 70.2 |
| 3 | −327.223 | 0.17 | | |
| 4 | 21.463 | 2.62 | 1.60311 | 60.6 |
| 5 | 72.302 | (variable) | | |
| 6 | 82.209 | 0.63 | 1.88300 | 40.8 |
| 7 | 9.524 | 1.24 | | |
| 8 | 27.577 | 0.55 | 1.83400 | 37.2 |
| 9 | 8.082 | 2.74 | | |
| 10 | −14.901 | 0.55 | 1.63854 | 55.4 |
| 11 | 413.057 | 0.17 | | |
| 12 | 19.743 | 2.25 | 1.92286 | 18.9 |
| 13 | −81.702 | (variable) | | |
| 14(stop) | ∞ | (variable) | | |
| 15* | 11.451 | 3.95 | 1.58313 | 59.4 |
| 16* | −62.934 | 0.59 | | |
| 17 | 37.988 | 1.98 | 1.48749 | 70.2 |
| 18 | −70.097 | 0.20 | | |
| 19 | 20.607 | 0.65 | 2.00069 | 25.5 |
| 20 | 9.143 | 0.61 | | |
| 21 | 11.454 | 4.11 | 1.48749 | 70.2 |
| 22 | −18.823 | 0.95 | | |
| 23 | −33.365 | 1.44 | 1.83481 | 42.7 |
| 24 | −13.232 | 0.55 | 1.62299 | 58.2 |
| 25 | 11.743 | (variable) | | |
| 26 | 13.600 | 3.10 | 1.77250 | 49.6 |
| 27 | −16.617 | 0.55 | 1.84666 | 23.9 |
| 28 | −122.927 | (variable) | | |
| 29 | ∞ | 1.94 | 1.51633 | 64.1 |
| 30 | ∞ | | | |
| Image plane | ∞ | | | |

Aspheric surface data

| | K | A5 | A7 |
|---|---|---|---|
| 15* | −7.393e−01 | 1.966e−06 | 3.501e−08 |
| 16* | −2.112e+02 | 1.275e−05 | −2.919e−08 |

Various data
Zoom ratio 9.79

| | Wide-angle | Middle | Telephoto |
|---|---|---|---|
| Focal length | 6.26 | 24.42 | 61.27 |
| F-number | 1.44 | 2.70 | 3.00 |
| Half angle of view | 26.77 | 7.07 | 2.80 |
| Image height | 3.03 | 3.03 | 3.03 |
| Total lens length | 74.47 | 74.47 | 74.47 |
| BF (back focus) | 8.16 | 11.58 | 5.90 |

| Distance | Wide-angle | Middle | Telephoto |
|---|---|---|---|
| d5 | 0.79 | 15.09 | 20.11 |
| d13 | 11.33 | 3.01 | 2.73 |
| d14 | 12.42 | 6.44 | 1.69 |
| d25 | 6.29 | 2.87 | 8.55 |
| d28 | 2.90 | 6.32 | 0.64 |

Numerical Example 2

Unit mm

Surface data

| Surface number | r | d | nd | vd |
|---|---|---|---|---|
| 1 | 27.532 | 0.85 | 1.84666 | 23.9 |
| 2 | 15.200 | 3.55 | 1.60311 | 60.6 |
| 3 | −7448.444 | 0.20 | | |
| 4 | 13.889 | 2.17 | 1.69680 | 55.5 |
| 5 | 38.986 | (variable) | | |
| 6 | 35.583 | 0.65 | 1.88300 | 40.8 |
| 7 | 6.294 | 0.77 | | |
| 8 | 16.050 | 0.65 | 1.83481 | 42.7 |
| 9 | 4.250 | 1.83 | | |
| 10 | −9.571 | 0.60 | 1.70154 | 41.2 |
| 11 | 30.036 | 0.17 | | |
| 12 | 11.544 | 1.47 | 1.92286 | 18.9 |
| 13 | −41.800 | (variable) | | |
| 14(stop) | ∞ | (variable) | | |
| 15* | 9.394 | 2.48 | 1.72903 | 54.0 |
| 16* | −17.893 | 0.17 | | |
| 17 | 25.770 | 0.60 | 1.84666 | 23.9 |
| 18 | 8.130 | 0.52 | | |
| 19 | 14.805 | 3.15 | 1.48749 | 70.2 |
| 20 | −7.265 | 0.80 | | |
| 21 | −33.289 | 1.60 | 1.80518 | 25.4 |
| 22 | −6.812 | 0.60 | 1.70154 | 41.2 |
| 23 | 7.222 | (variable) | | |
| 24 | 8.040 | 3.12 | 1.71300 | 53.9 |
| 25 | −6.371 | 0.60 | 1.94595 | 18.0 |
| 26 | −13.152 | (variable) | | |
| 27 | ∞ | 1.00 | 1.51633 | 64.1 |
| 28 | ∞ | 3.00 | | |
| 29 | ∞ | | | |
| Image plane | ∞ | | | |

Aspheric surface data

| | K | A5 | A7 |
|---|---|---|---|
| 15* | −1.353e+00 | 7.355e−05 | −1.892e−06 |
| 16* | −2.877e+01 | 1.446e−04 | −2.575e−06 |

Various data
Zoom ratio 9.78

| | Wide-angle | Middle | Telephoto |
|---|---|---|---|
| Focal length | 3.20 | 12.02 | 31.25 |
| F-number | 1.44 | 2.70 | 3.00 |
| Half angle of view | 26.59 | 7.41 | 2.85 |
| Image height | 1.54 | 1.54 | 1.54 |
| Total lens length | 50.52 | 50.52 | 50.52 |
| BF | 4.25 | 5.99 | 4.25 |

| Distance | Wide-angle | Middle | Telephoto |
|---|---|---|---|
| d5 | 0.72 | 9.30 | 12.31 |
| d13 | 7.76 | 1.12 | 1.97 |
| d14 | 7.29 | 5.36 | 1.50 |
| d23 | 3.97 | 2.23 | 3.96 |
| d26 | 0.59 | 2.33 | 0.60 |

Numerical Example 3

Unit mm

Surface data

| Surface number | r | d | nd | vd |
|---|---|---|---|---|
| 1 | 32.931 | 1.20 | 1.84666 | 23.9 |
| 2 | 18.332 | 3.76 | 1.60311 | 60.6 |
| 3 | 84.348 | 0.25 | | |
| 4 | 23.800 | 2.44 | 1.80400 | 46.6 |
| 5 | 88.718 | (variable) | | |
| 6 | 35.178 | 0.65 | 1.88300 | 40.8 |
| 7 | 5.800 | 3.29 | | |
| 8 | −18.336 | 0.60 | 1.60311 | 60.6 |
| 9 | 18.548 | 0.20 | | |
| 10 | 11.368 | 1.48 | 1.94595 | 18.0 |
| 11 | 29.301 | (variable) | | |
| 12(Stop) | ∞ | (variable) | | |
| 13* | 22.720 | 2.69 | 1.72903 | 54.0 |
| 14* | −15.316 | 0.30 | | |
| 15 | −50.081 | 0.87 | 1.84666 | 23.9 |
| 16 | 24.256 | 0.86 | | |
| 17 | 17.077 | 4.35 | 1.48749 | 70.2 |
| 18 | −11.272 | 1.80 | | |
| 19 | −33.506 | 1.49 | 1.84666 | 23.9 |
| 20 | −12.298 | 0.60 | 1.60311 | 60.6 |
| 21 | 10.427 | (variable) | | |
| 22 | 12.998 | 3.79 | 1.80400 | 46.6 |
| 23 | −8.716 | 0.87 | 1.92286 | 18.9 |
| 24 | −33.809 | (variable) | | |
| 25 | ∞ | 1.94 | 1.51633 | 64.1 |
| 26 | ∞ | 4.00 | | |
| 27 | ∞ | | | |
| Image plane | ∞ | | | |

Aspheric surface data

| | K | A5 | A7 |
|---|---|---|---|
| 13* | −1.003e+01 | −1.652e−05 | −1.540e−07 |
| 14* | −4.603e+00 | −1.234e−05 | 7.228e−08 |

Various data
Zoom ratio 9.95

| | Wide-angle | Middle | Telephoto |
|---|---|---|---|
| Focal length | 4.61 | 18.75 | 45.93 |
| F-number | 1.44 | 2.60 | 3.00 |
| Half angle of view | 27.02 | 6.86 | 2.80 |
| Image height | 2.25 | 2.25 | 2.25 |
| Total lens length | 67.84 | 67.84 | 67.84 |
| BF | 6.78 | 9.52 | 6.78 |

| Distance | Wide-angle | Middle | Telephoto |
|---|---|---|---|
| d5 | 0.80 | 15.28 | 20.37 |
| d11 | 11.00 | 4.99 | 2.00 |
| d12 | 12.39 | 3.93 | 1.83 |
| d21 | 5.37 | 2.63 | 5.37 |
| d24 | 1.50 | 4.24 | 1.50 |

Numerical Example 4

Unit mm

Surface data

| Surface number | r | d | nd | vd |
|---|---|---|---|---|
| 1 | 35.549 | 1.20 | 1.84666 | 23.9 |
| 2 | 19.583 | 3.50 | 1.60311 | 60.6 |
| 3 | 95.535 | 0.25 | | |
| 4 | 24.751 | 2.29 | 1.80400 | 46.6 |
| 5 | 88.129 | (variable) | | |
| 6 | 35.581 | 0.65 | 1.88300 | 40.8 |
| 7 | 6.075 | 3.33 | | |
| 8 | −22.253 | 0.60 | 1.60311 | 60.6 |
| 9 | 17.522 | 0.20 | | |
| 10 | 11.393 | 1.97 | 1.92286 | 18.9 |
| 11 | 30.141 | (variable) | | |
| 12(Stop) | ∞ | (variable) | | |
| 13* | 23.569 | 2.21 | 1.72903 | 54.0 |
| 14* | −23.471 | 0.30 | | |
| 15 | −288.915 | 0.87 | 1.84666 | 23.9 |
| 16 | 19.769 | 0.94 | | |
| 17 | 16.620 | 4.65 | 1.69680 | 55.5 |
| 18 | −14.441 | 1.79 | | |
| 19 | −65.099 | 1.00 | 1.59282 | 68.6 |
| 20 | 9.559 | (variable) | | |
| 21 | 13.786 | 3.32 | 1.80400 | 46.6 |
| 22 | −11.204 | 0.87 | 1.92286 | 18.9 |
| 23 | −39.171 | (variable) | | |
| 24 | ∞ | 1.94 | 1.51633 | 64.1 |
| 25 | ∞ | | | |
| Image plane | ∞ | | | |

Aspheric surface data

| | K | A5 | A7 |
|---|---|---|---|
| 13* | −1.638e+01 | −7.113e−06 | −3.915e−07 |
| 14* | −4.473e+00 | −2.763e−07 | −1.853e−07 |

Various data
Zoom ratio 9.97

| | Wide-angle | Middle | Telephoto |
|---|---|---|---|
| Focal length | 4.61 | 18.97 | 45.96 |
| F-number | 1.44 | 2.60 | 3.00 |
| Half angle of view | 27.05 | 6.79 | 2.80 |
| Image height | 2.25 | 2.25 | 2.25 |
| Total lens length | 67.83 | 67.83 | 67.83 |
| BF | 6.96 | 9.60 | 6.77 |

| Distance | Wide-angle | Middle | Telephoto |
|---|---|---|---|
| d5 | 0.79 | 16.27 | 21.71 |
| d11 | 11.78 | 3.33 | 2.00 |
| d12 | 12.83 | 5.80 | 1.70 |
| d20 | 5.49 | 2.86 | 5.69 |
| d23 | 1.69 | 4.32 | 1.49 |

Numerical Example 5

Unit mm

Surface data

| Surface number | r | d | nd | vd |
|---|---|---|---|---|
| 1 | −445.578 | 1.40 | 2.00069 | 25.5 |
| 2 | 45.403 | 4.63 | 1.69680 | 55.5 |
| 3 | −113.613 | 0.15 | | |
| 4 | 48.425 | 2.47 | 1.80400 | 46.6 |
| 5 | 183.964 | 0.15 | | |
| 6 | 28.615 | 3.09 | 1.80400 | 46.6 |
| 7 | 78.172 | (variable) | | |
| 8 | −299.776 | 0.80 | 1.88300 | 40.8 |
| 9 | 6.454 | 1.93 | | |
| 10 | −40.545 | 0.60 | 1.83481 | 42.7 |
| 11 | 30.252 | 1.39 | | |

-continued

| Unit mm | | | | |
|---|---|---|---|---|
| 12 | −9.815 | 0.60 | 2.00100 | 29.1 |
| 13 | −30.952 | 0.16 | | |
| 14 | 84.510 | 2.00 | 1.94595 | 18.0 |
| 15 | −15.051 | (variable) | | |
| 16(Stop) | ∞ | (variable) | | |
| 17* | 32.773 | 3.33 | 1.58313 | 59.4 |
| 18 | −24.703 | 0.15 | | |
| 19 | −182.270 | 2.40 | 1.48749 | 70.2 |
| 20 | −32.549 | 0.30 | | |
| 21 | 26.751 | 0.80 | 2.00069 | 25.5 |
| 22 | 12.480 | 2.54 | | |
| 23 | 21.274 | 5.20 | 1.58313 | 59.4 |
| 24* | −12.750 | 1.78 | | |
| 25 | 32.027 | 1.12 | 1.92286 | 18.9 |
| 26 | 109.308 | 0.80 | 1.91082 | 35.3 |
| 27 | 11.929 | (variable) | | |
| 28 | 11.110 | 4.24 | 1.59282 | 68.6 |
| 29 | −14.053 | 0.80 | 1.92286 | 18.9 |
| 30 | −33.885 | (variable) | | |
| 31 | ∞ | 2.00 | 1.51633 | 64.1 |
| 32 | ∞ | | | |
| Image plane | ∞ | | | |

| Aspheric coefficient | | | | |
|---|---|---|---|---|
| | K | A4 | A6 | A8 |
| 17* | 0.000e+00 | −1.937e−04 | 1.968e−07 | −1.475e−08 |
| 24* | 0.000e+00 | 8.161e−06 | −2.229e−07 | |

Various data
Zoom ratio 10.04

| | Wide-angle | Middle | Telephoto |
|---|---|---|---|
| Focal length | 3.59 | 14.03 | 36.05 |
| F-number | 1.40 | 2.58 | 3.00 |
| Half angle of view | 35.40 | 9.15 | 3.57 |
| Image height | 2.25 | 2.25 | 2.25 |
| Total lens length | 84.67 | 84.67 | 84.67 |
| BF | 6.82 | 10.69 | 10.24 |

| Distance | Wide-angle | Middle | Telephoto |
|---|---|---|---|
| d7 | 1.11 | 17.49 | 23.25 |
| d15 | 10.00 | 4.58 | 2.50 |
| d16 | 17.15 | 6.19 | 2.50 |
| d27 | 6.76 | 2.88 | 3.34 |
| d30 | 1.50 | 5.37 | 4.92 |

TABLE 1

| | Numerical Examples | | | | |
|---|---|---|---|---|---|
| Conditions | 1 | 2 | 3 | 4 | 5 |
| Ds3W/|f12w| | 1.05 | 1.17 | 1.08 | 1.16 | 2.07 |
| |f3b|/f3a | 1.21 | 1.34 | 1.15 | 1.29 | 1.53 |
| D13w/Ds3w | 2.63 | 2.45 | 3.01 | 2.51 | 2.08 |
| L3ab/D3 | 0.87 | 0.84 | 0.78 | 0.92 | 0.90 |
| |f3b|/fw | 2.54 | 3.38 | 2.89 | 3.03 | 6.13 |
| f3/|f3b| | 1.20 | 1.17 | 1.33 | 1.31 | 0.92 |
| f3/f4 | 1.13 | 1.34 | 1.44 | 1.27 | 1.13 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-123561 filed May 30, 2012, which is hereby incorporated by reference herein in its entirety.

What is claimed is:

1. A zoom lens comprising, in order from an object side to an image side:
   a first lens unit having positive refractive power;
   a second lens unit having negative refractive power;
   an aperture stop;
   a third lens unit having positive refractive power; and
   a fourth lens unit having positive refractive power,
   wherein the second lens unit, the aperture stop, and the fourth lens unit move during zooming from a wide-angle end to a telephoto end,
   wherein the third lens unit includes, in order from the object side to the image side, a first lens sub-unit having positive refractive power, and a second lens sub-unit having negative refractive power,
   wherein the second lens sub-unit is movable in a direction having a component perpendicular to an optical axis to change an image forming position in a direction perpendicular to the optical axis, and
   wherein, when a distance between the aperture stop and the third lens unit at the wide-angle end is denoted by $Ds3w$, a composite focal length of the first lens unit and the second lens unit at the wide-angle end is denoted by $f12w$, a focal length of the first lens sub-unit is denoted by $f3a$, and a focal length of the second lens sub-unit is denoted by $f3b$, the following conditions are satisfied:

$$0.9 < Ds3w/|f12w| < 3.0$$

$$0.8 < |f3b|/f3a < 2.0.$$

2. The zoom lens according to claim 1, wherein, when a distance between the first lens unit and the third lens unit at the wide-angle end is denoted by $D13w$, the following condition is satisfied:

$$1.5 < D13w/Ds3w < 4.0.$$

3. The zoom lens according to claim 1, wherein, when a distance on the optical axis between a lens surface closest to the object side among surfaces of the third lens unit and a lens surface closest to the object side among surfaces of the second lens sub-unit is denoted by $L3ab$, and a thickness of the third lens unit on the optical axis is denoted by $D3$, the following condition is satisfied:

$$0.6 < L3ab/D3 < 1.0.$$

4. The zoom lens according to claim 1, wherein, when a focal length of the entire zoom lens at the wide-angle end is denoted by $fw$, the following condition is satisfied:

$$2.0 < |f3b|/fw < 8.0.$$

5. The zoom lens according to claim 1, wherein, when a focal length of the third lens unit is denoted by $f3$, the following condition is satisfied:

$$0.8 < f3/|f3b| < 1.6.$$

6. The zoom lens according to claim 1, wherein, when a focal length of the third lens unit is denoted by $f3$, and a focal length of the fourth lens unit is denoted by $f4$, the following condition is satisfied:

$$0.9 < f3/f4 < 1.8.$$

7. The zoom lens according to claim 1, wherein the second lens sub-unit includes a cemented lens composed of a positive lens and a negative lens.

8. The zoom lens according to claim 1, wherein the second lens sub-unit includes one negative lens.

9. The zoom lens according to claim 1, wherein the first lens sub-unit includes one or more positive lenses and one or more negative lenses.

10. An image pickup apparatus comprising:
a zoom lens; and
an image sensor configured to receive an image formed by the zoom lens,
wherein the zoom lens comprises, in order from an object side to an image side:
a first lens unit having positive refractive power;
a second lens unit having negative refractive power;
an aperture stop;
a third lens unit having positive refractive power; and
a fourth lens unit having positive refractive power,
wherein the second lens unit, the aperture stop, and the fourth lens unit move during zooming from a wide-angle end to a telephoto end,
wherein the third lens unit includes, in order from the object side to the image side, a first lens sub-unit having positive refractive power, and a second lens sub-unit having negative refractive power,
wherein the second lens sub-unit is movable in a direction having a component perpendicular to an optical axis to change an image forming position in a direction perpendicular to the optical axis, and
wherein, when a distance between the aperture stop and the third lens unit at the wide-angle end is denoted by Ds3w, a composite focal length of the first lens unit and the second lens unit at the wide-angle end is denoted by f12w, a focal length of the first lens sub-unit is denoted by f3a, and a focal length of the second lens sub-unit is denoted by f3b, the following conditions are satisfied:

$$0.9 < Ds3w/|f12w| < 3.0$$

$$0.8 < |f3b|/f3a < 2.0.$$

* * * * *